(12) United States Patent
Bowers et al.

(10) Patent No.: US 9,910,463 B1
(45) Date of Patent: Mar. 6, 2018

(54) COMBINATION HARDSTOP AND SWITCH FOR ACTUATED LOCKING DEVICES

(71) Applicant: Microsoft Technology Licensing, LLC, Redmond, WA (US)

(72) Inventors: Scott Douglas Bowers, Woodinville, WA (US); Yazan Aldehayyat, Seattle, WA (US); James Hao-An Chen Lin, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/236,155

(22) Filed: Aug. 12, 2016

(51) Int. Cl.
*G06F 1/16* (2006.01)
*E05B 51/00* (2006.01)

(52) U.S. Cl.
CPC .......... *G06F 1/1679* (2013.01); *E05B 51/005* (2013.01); *G06F 1/1616* (2013.01); *G06F 1/1669* (2013.01); *G06F 1/1681* (2013.01)

(58) Field of Classification Search
CPC ..... G06F 1/1669; G06F 1/1679; G06F 1/1681
See application file for complete search history.

(56) References Cited

U.S. PATENT DOCUMENTS

| | | | | |
|---|---|---|---|---|
| 6,999,801 | B2 * | 2/2006 | Cheng | H04M 1/0216 455/550.1 |
| 8,441,791 | B2 * | 5/2013 | Bohn | G06F 1/1681 16/286 |
| 8,540,062 | B2 * | 9/2013 | Holman, IV | F16F 9/12 188/290 |
| 8,852,164 | B2 | 10/2014 | Murphy et al. | |
| 9,710,022 | B2 * | 7/2017 | Lee | G06F 1/1656 |
| 9,740,245 | B2 * | 8/2017 | Gault | G06F 1/1635 |
| 9,785,196 | B1 * | 10/2017 | Bowers | G06F 1/1616 |
| 2002/0069483 | A1 | 6/2002 | Savolainen et al. | |
| 2008/0227060 | A1 | 9/2008 | Esashi et al. | |
| 2009/0223604 | A1 | 9/2009 | Luntz et al. | |

(Continued)

FOREIGN PATENT DOCUMENTS

| DE | 202013007862 U1 | 12/2014 |
|---|---|---|
| WO | 2006133540 A1 | 12/2006 |

OTHER PUBLICATIONS

Schenck, Stephen, "Surface Book makes a fake "click" sound effect during screen removal to reassure its users", Published on: Oct. 8, 2015 Available at: http://pocketnow.com/2015/10/08/surface-book-click-sound-effect.

(Continued)

*Primary Examiner* — Adrian S Wilson
(74) *Attorney, Agent, or Firm* — Arent Fox LLP

(57) ABSTRACT

Aspects described herein generally relate to an actuated locking device. The actuated locking device includes a locking mechanism moveable between a first position and a second position, an actuator connected to the locking mechanism that actuates the locking mechanism for moving between the first position and the second position, and a hardstop switch that limits movement of the locking mechanism to at least one of the first position or the second position, in contact with the hardstop switch. The hardstop switch comprises a body including an electrically conductive surface defining a switch that completes an electrical circuit when the locking mechanism contacts the body of the hardstop switch.

20 Claims, 11 Drawing Sheets

(56) References Cited

U.S. PATENT DOCUMENTS

| | | |
|---|---|---|
| 2009/0250952 A1 | 10/2009 | Niskanen et al. |
| 2010/0238620 A1* | 9/2010 | Fish .................... G06F 1/1616 |
| | | 361/679.09 |
| 2012/0126551 A1 | 5/2012 | Alexander et al. |
| 2014/0187984 A1 | 7/2014 | Burkett |
| 2014/0193193 A1 | 7/2014 | Wikander et al. |
| 2014/0338408 A1 | 11/2014 | Hsu et al. |
| 2015/0092333 A1 | 4/2015 | Kim |

OTHER PUBLICATIONS

"International Search Report and Written Opinion Issued in PCT Application No. PCT/US2017/045818", dated Nov. 22, 2017, 13 Pages.

* cited by examiner

COMBINATION HARDSTOP AND SWITCH FOR ACTUATED LOCKING DEVICES

BACKGROUND

Use of computing devices is becoming more ubiquitous by the day. Computing devices range from standard desktop computers to wearable computing technology and beyond. One area of computing devices that has grown in recent years is in hybrid computers. Hybrid computers may act as a tablet computer or a laptop computer, and may include input devices that may be coupled to or separated from (e.g., removably attached to) a display portion, where the display portion may also include other components that facilitate operation of the computer (e.g., processor, memory, etc.). These computers often include one or a series of locking mechanisms to allow for attaching and/or detaching a housing of the input device to/from a housing of the display portion. The locking mechanism assures that, when attached, an interface connection between the input device and the display portion remains in sufficient electrical contact to allow communication between the input device and the display portion. Due to their extensive use and because of the mechanical nature of some of their components, existing locking mechanisms are typically prone to wear and breakage.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, an actuated locking device is provided that includes a locking mechanism moveable between a first position and a second position, an actuator connected to the locking mechanism that actuates the locking mechanism for moving between the first position and the second position, and a hardstop switch that limits movement of the locking mechanism to at least one of the first position or the second position, in contact with the hardstop switch. The hardstop switch includes a body including an electrically conductive surface defining a switch that completes an electrical circuit when the locking mechanism contacts the body of the hardstop switch.

In another example, a computing device is provided that includes a first portion, a second portion removably coupled to the first portion, a locking mechanism configured to lock the first portion to the second portion. The locking mechanism includes a locking receptacle connected to one of the first portion or the second portion, and a locking protrusion connected to the other one of the first portion or the second portion. The computing device also includes an actuator mechanically coupled to the locking mechanism and configured to move the locking mechanism between a first position and a second position, where one of the first position or the second position corresponds to a locked state and the other one of the first position or the second position corresponds to an unlocked state. The actuator includes a hardstop switch that limits movement of the locking mechanism to at least one of the first position or the second position, in contact with the hardstop switch. The hardstop switch includes a body including an electrically conductive surface defining a switch that completes an electrical circuit when the locking mechanism contacts the body of the hardstop switch.

In another example, a method for controlling an actuated locking device is provided. The method includes actuating a locking mechanism to move between a first position and a second position, detecting completion of an electrical circuit at a hardstop switch caused by the locking mechanism contacting the hardstop switch at one of the first position or the second position, and maintaining actuation of the locking mechanism at the one of the first position or the second position based at least in part on detecting completion of the electrical circuit.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8-1 is a partial cross-sectional side view of an example of a locking system in an undocked configuration.

FIG. 8-1-1 is a zoom-in-view of area 8-1-1 of the locking system in FIG. 8-1.

FIG. 8-2 is a partial cross-sectional side view of the example of the locking system in FIG. 8-1 in a locked configuration.

FIG. 8-2-1 is a zoom-in-view of an example of area 8-2-1 of the locking mechanism in FIG. 8-2.

FIG. 8-3 is a partial cross-sectional side view of the example of the locking mechanism in FIG. 8-1 in an unlocked configuration.

DETAILED DESCRIPTION

Figure 1:
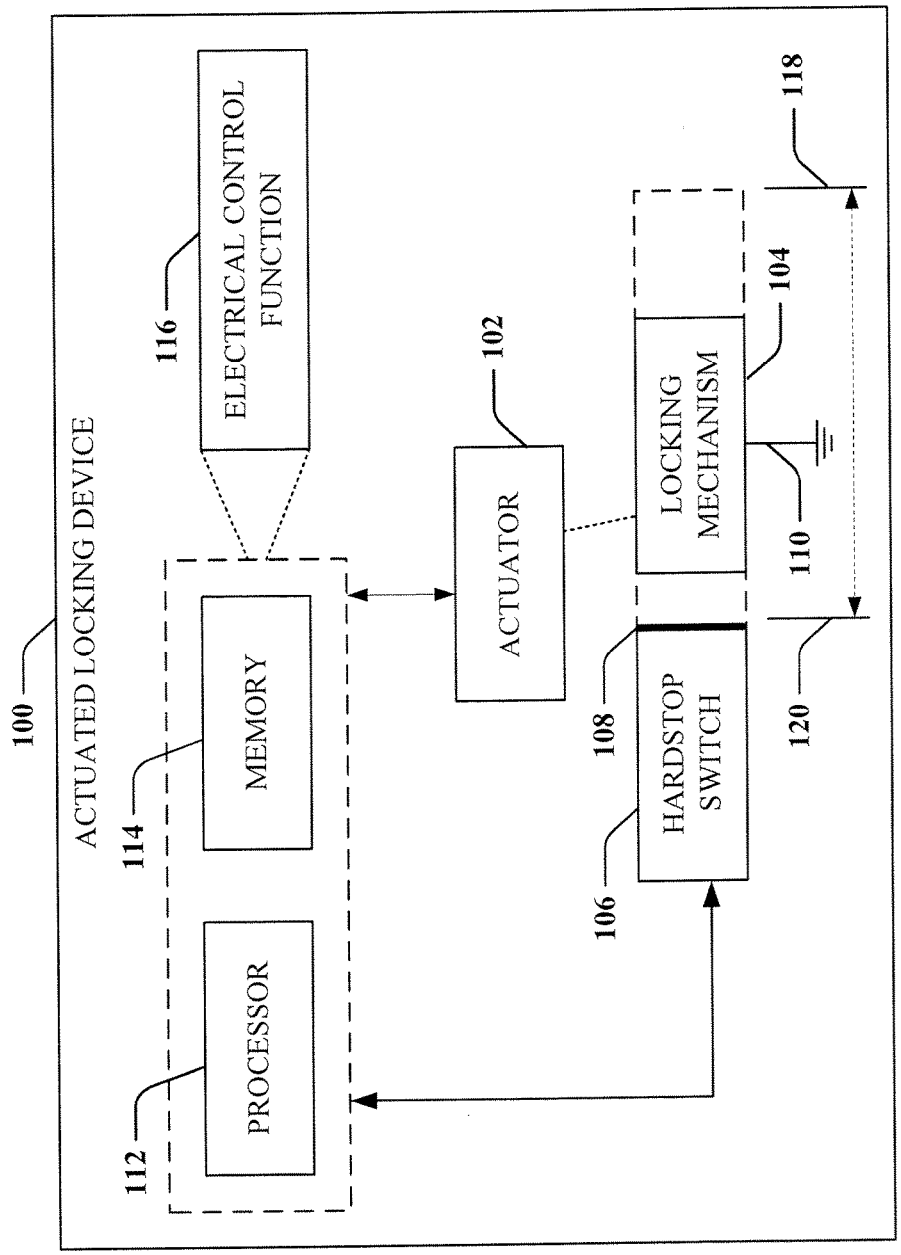
FIG. 1 illustrates a schematic diagram of an example of an actuated locking device in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various aspects related to a combined hardstop and switch (also referred to herein as a "hardstop switch") for an actuated locking device. An actuator can actuate a locking mechanism among a plurality of positions (e.g., between a first position and a second position) to provide a locking or unlocking action. The actuated locking device can include the hardstop switch to stop movement of the locking mechanism based on contacting a surface of a body of the hardstop switch. The surface of the body, if not the entire hardstop switch, can be electrically conductive (e.g., composed of an electrically conductive material) such that contact of the locking mechanism with the surface of the hardstop switch can be detected based on detecting completion of an electrical circuit at the hardstop switch. In this example, the locking mechanism can be electrically coupled to a system ground to allow detection of the completion of the electrical circuit at the electrically conductive surface of the hardstop switch. Additionally, in some aspects, based on detecting completion of the electrical circuit, for example, the actuator can maintain an actuation of the locking mechanism (e.g., at least for a period of time).

In one specific example, the actuator can include a wire attached to the locking mechanism such that movement of the wire causes movement of the locking mechanism. The wire may have an elasticity property (such as a shape memory alloy (SMA) wire, which may include but is not limited to a nickel titanium (nitinol) wire) where the wire can switch between phases to lengthen (e.g., expand) and shorten (e.g., contract) a length of the wire (e.g., or a shape of the wire) based on a temperature applied to the wire, or based on stress applied to the wire. In this example, the actuator can include an actuating element to provide a heat source to the wire (e.g., an electrical signal that results in heat based on resistance in the wire) to cause actuation of the locking mechanism from a first position to a second position by causing the wire to contract or shorten from a first phase (e.g., an original shape of the wire) to a second phase (e.g., a deformed shape of the wire). Similarly, the actuating element may lower a temperature of the heat source applied to the wire to expand or lengthen the wire (e.g., from the second phase to the first phase or another phase in between the second phase and the first phase) to at least partially cause actuation of the locking mechanism back toward the first position. In addition, the actuator can include a mechanism with an elasticity to store mechanical energy, such as a spring element, that stretches when the locking mechanism is actuated by the wire from the first position to the second position. As such, the spring element provides a spring force to return the locking mechanism to the first position (e.g., corresponding to the original shape or a less deformed shape or longer length of the wire) when the wire is cooled, de-stressed, or otherwise released from the second phase.

In a specific example, the actuator can continue to apply and/or increase the heat source applied from the actuating element to the wire to cause continued contraction of the wire until contact of the locking mechanism with the hardstop switch is detected based on detecting completion of an electrical circuit at the hardstop switch. When the completion of the electrical circuit is detected, the actuator can dynamically apply (e.g., modulate) the electrical signal to the wire to substantially maintain a temperature of the wire within a temperature range, which can result in the wire substantially maintaining its present contracted position such to keep the locking mechanism in electrical contact with the hardstop switch at the second position. In this regard, the hardstop switch can limit actuation of the locking mechanism to the second position in contact with the hardstop switch. In an example, the actuator can dynamically apply the electrical signal for a period of time to hold the temperature of the wire, e.g., to allow a user time to separate two portions of a computing device that have been locked together by the locking mechanism, after which the wire can be allowed to cool to cause the locking mechanism to return to the first position.

The concepts described herein advantageously combine a mechanical hardstop and an electrical switch to control movement of an actuated locking device. Such a combined hardstop switch may reduce or eliminate the design tolerance issues that occur with respect to taking into account the combined tolerances and relative positional alignment required when designing a system having the mechanical hardstop separately positioned from the electrical switch (e.g., especially with respect to an electrical switch having a moving mechanical switch body). As such, the concepts described herein can allow for using a lower profile and/or less complex combined hardstop switch of substantially any geometry (e.g., when used in thin tablet computers or other compact devices), with a relatively more easily achievable tolerance requirement as compared to having the mechanical hardstop separately positioned from the electrical switch. This can reduce design requirements and manufacturing cost for the combined hardstop switch as compared to having the mechanical hardstop separately positioned from the electrical switch. Moreover, the concepts described herein can prevent damage that can otherwise be caused by excessive force applied to a locking mechanism against a mechanical hardstop and/or an electrical switch. Additionally, the concepts described herein may allow for decreasing risk of damaging the locking mechanism and/or protecting sensitive nearby components in a device that utilizes the actuated locking device by reducing or eliminating occurrence of excessive force applied to (and thus potential breaking of) the hardstop.

Figure 2:
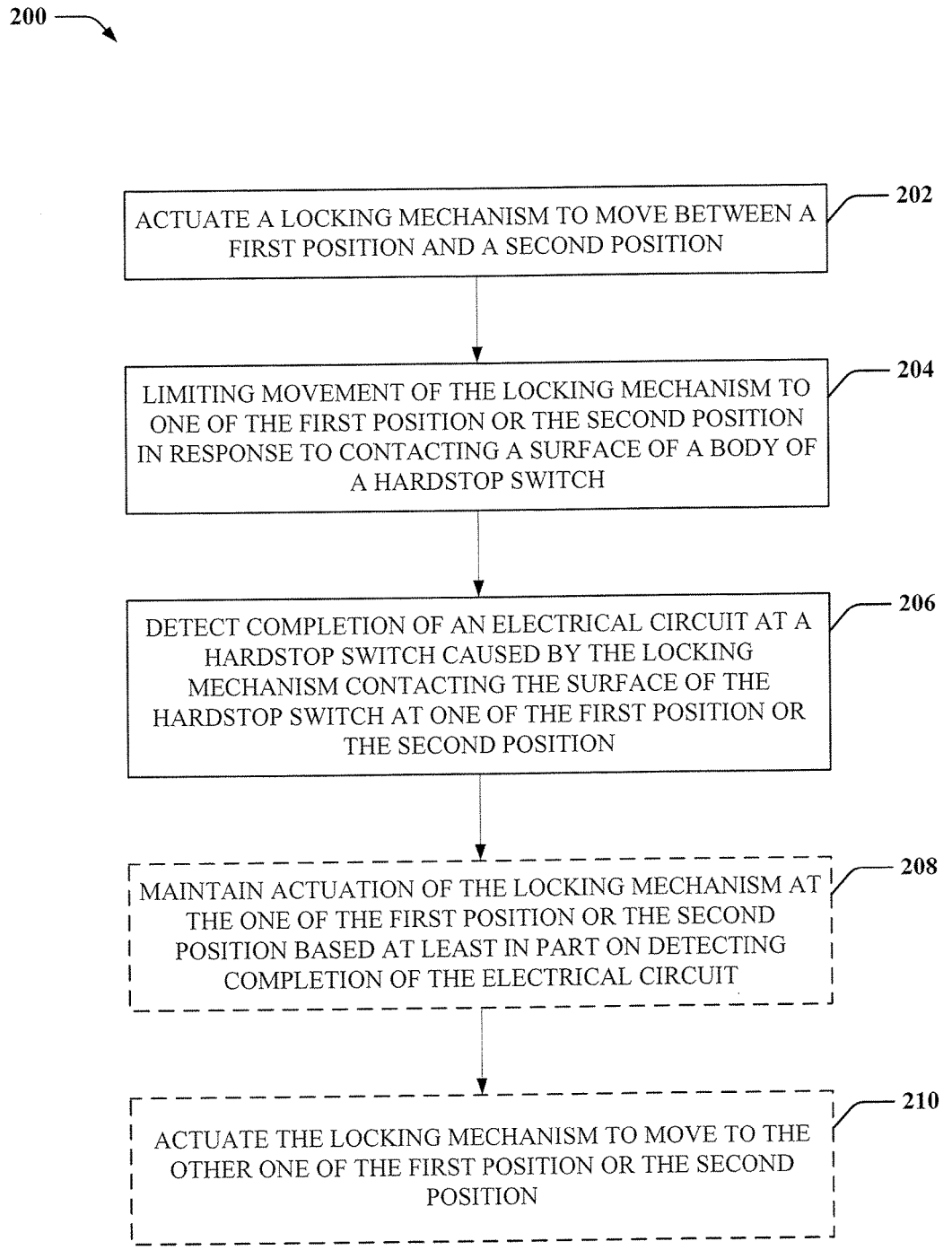
FIG. 2 illustrates a flow diagram of an example of a method for actuating an actuated locking device in accordance with aspects described herein.

Turning now to FIGS. 1-2, examples are depicted with reference to one or more components and one or more methods that may perform the actions or operations described herein, where components and/or actions/operations in dashed line may be optional. Although the operations described below in FIG. 2 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of an actuated locking device 100 in accordance with aspects described herein. For example, actuated locking device 100 can be employed by a device to lock one or more portions of the device (e.g., to another portion of the device, to another device, to a dock, etc.). In an example, actuated locking device 100 can include an actuator 102 for actuating a locking mechanism 104 among a plurality of positions including at least a first position 118 and a second position 120 to provide a locking and/or unlocking action. For example, the locking mechanism 104 can be a mechanical locking mechanism that may include a locking protrusion that moves within a locking receptacle or recess to cause the locking and/or unlocking action. Further, it should be noted that while FIG. 1 illustrates linear movement of locking mechanism 104 between first position 118 and second position 120, locking mechanism 104 may be configured for any type of movement (e.g., along a curve, curvilinear, movement in more than one plane, etc.). Additionally, actuated locking device 100 can include a hardstop switch 106 that can limit actuation of the locking mechanism 104 in both a mechanical and electrical fashion. For example, the locking mechanism 104 can move among the plurality of positions (e.g., from first position 118 to second position 120) based on actuation by the actuator 102. Actuation of the locking mechanism 104 can be caused to stop and/or be maintained at second position 120 based on the locking mechanism 104 contacting the hardstop switch 106, which is positioned to limit movement of locking mechanism 104 and also which acts as a switch that controls actuator 102 in actuating locking mechanism 104.

Conventionally, a prior art hardstop can be composed of a material having a tolerance to resist force of the locking mechanism 104 as controlled by the actuator 102; however, the prior art hardstop and/or locking mechanism 104, or related components, may wear overtime due to force being applied by the locking mechanism 104 against the prior art hardstop. To avoid application of excess force, the hardstop switch 106 described herein may include a conductive surface 108 composed of an electrically conductive material, such that completion of an electrical circuit (described below) can be detected based on the locking mechanism 104 contacting the hardstop switch 106 at the conductive surface 108. For example, the locking mechanism 104 may be connected to an electrical ground 110 (e.g., of the device) to facilitate detection of completion of the electrical circuit at the conductive surface 108 of the hardstop switch 106. For example, in an aspect, detection of completion of the electrical circuit can cause the actuator 102 to maintain actuation of the locking mechanism 104 at the current position, at least for a certain period of time (e.g., a period of time to allow a user to separate the two locked portions). As such, over-actuation of locking mechanism 104 may be prevented. Further, the force of the maintaining of locking mechanism 104 in contact with conductive surface 108 helps to insure a good electrical connection at the interface of the surfaces.

Further, actuated locking device 100 may include or may otherwise be coupled with a processor 112 and/or memory 114, where the processor 112 and/or memory 114 may be configured to execute or store instructions or other parameters related to executing an electrical control function 116 for controlling actuator 102 and locking mechanism 104. For example, electrical control function 116 can be implemented to control the actuator 102 based on receiving a lock or unlock signal (e.g., based on a user input received at one of the portions that may be or that are to be locked together) and based on detecting the electrical circuit completed at the hardstop switch 106 (e.g., based on receiving a signal or other notification of completion of the electrical circuit), etc. For instance, the electrical circuit may include a removable electrical connection (e.g., a circuit board) between processor 112 (and memory 114 and electrical control function 116), hardstop switch 106, locking mechanism 104 and ground 110, such that processor 112 can detect when locking mechanism 104 contacts or does not contact conductive surface 108 of hardstop switch 106 and correspondingly control actuation of actuator 102. In an example, electrical control function 116 can detect or otherwise receive notification (e.g., the lock or unlock signal) of an event to cause actuation of the locking mechanism 104. For example, electrical control function 116 may detect activation of an electronic switch on a device utilizing the actuated locking device 100, which is to cause the locking mechanism 104 to move to a locked or unlocked state. In this example, electrical control function 116 can control the actuator 102 (e.g., via processor 112) to actuate the locking mechanism 104 based on the received notification.

For example, where the actuator 102 includes an actuation element (e.g., an electrical circuit for sending an electrical signal; also referred to as a heating element) and a wire, to which the locking mechanism 104 is coupled, electrical control function 116 can control actuation of the actuator 102. For instance, electrical control function 116 can cause the actuation element to modify an electrical signal applied to the wire, causing the wire to contract or expand to move the locking mechanism 104. For instance, the actuation element may include an electrical circuit and/or an electrical connector, and the wire may be a shape memory alloy wire, such that the heat is an electrical signal applied to the wire to cause heat based on the resistance in the wire). Also, in this example, actuator 102 may include a spring element that generates a spring force opposing the movement of the shape memory alloy wire when actuated. As such, when the actuation of the shape memory alloy wire is stopped, the spring force acts on the shape memory alloy wire to return the wire to the original position (e.g., prior to actuation). In this example, electrical control function 116 can additionally detect an event corresponding to completion of an electrical circuit at the conductive surface 108 of the hardstop switch 106. For example, when the locking mechanism 104 is actuated to a position where it contacts the conductive surface 108, electrical control function 116 can detect completion of the electrical circuit at the hardstop switch 106 (e.g., based on receiving an electrical signal from the hardstop switch 106). In this example, electrical control function 116 can control the actuator 102 to maintain actuation of the locking mechanism 104 at a current position, e.g., second position 120 in contact with the hardstop switch 106 (e.g., at least for a period of time and/or based on electrical control function 116 detecting another event, such as activation of the same or another electronic switch to cause actuation of the locking mechanism 104 in the other direction). Using hardstop switch 106 in this regard allows actuation of the locking mechanism 104 to stop or be maintained at a current level (or within a range of a current level) based on the detected completion of the electrical circuit, which may result from sufficient electrical contact of the locking mechanism 104 to the conductive surface 108. This contact may require less tolerance of the hardstop switch 106, as compared to prior art systems having a separate mechanical hardstop and electrical switch, and may thus result in less wear to the hardstop switch 106 and/or locking mechanism 104.

FIG. 2 is a flowchart of an example of a method 200 for actuating an actuated locking device in accordance with aspects described herein. For example, method 200 can be performed by actuated locking device 100, a device employing actuated locking device 100, etc., and/or specifically electrical control function 116 or other function implemented by processor 112 of actuated locking device 100, a corresponding device, etc., to lock or unlock actuated locking device 100.

In method 200, at action 202, a locking mechanism can be actuated to move between a first position and a second position. For example, actuator 102, e.g., in conjunction with processor 112, memory 114, electrical control function 116, etc., can actuate a locking mechanism portion (e.g., locking mechanism 104) of actuated locking device 100 to move the locking mechanism 104 between a first position 118 and a second position 120. As described above and further herein, the locking mechanism 104 can provide a locking and/or unlocking action to lock a first portion of a device to a second portion of the device, unlock the first portion of the device from the second portion of the device, lock/unlock the device to/from another device, such as a similar device, a dock, one or more input devices, etc., and/or the like. In one example, one of the first position 118 or the second position 120 of the locking mechanism 104 may correspond to a locked state and the other one of the first position or the second position of the locking mechanism 104 may correspond to an unlocked state, or vice versa.

In a specific example, actuating the locking mechanism at action 202 may include actuator 102 including controlling a wire to which the locking mechanism is attached, as described further herein. For example, the wire may be a SMA wire that can be formed into different phases corresponding to different shapes or lengths by heating/cooling the wire, or via applying or releasing stress to the wire. In this example, actuating the locking mechanism at action 202 may include actuator 102 having, and electrical control function 116 controlling, an actuation element to provide a heat source to, or remove the heat source from, the SMA wire to cause the SMA wire to contract or expand. For example, actuator 102, e.g., in conjunction with processor 112, memory 114, electrical control function 116, etc., may control the actuation element to apply the heat source (e.g., an electrical signal supplied to the wire) to increase a temperature of the SMA wire to cause the wire to contract (e.g., from a first phase corresponding to a first shape, such as an original shape of the SMA wire, to a second phase corresponding to a second shape, such as a deformed shape of the SMA wire). In another example, actuator 102 may control the actuation element to apply the heat source to decrease a temperature of the SMA wire to cause the wire to expand (e.g., towards the first phase corresponding to a first shape, such as an original shape of the SMA wire, from the second phase corresponding to a second shape, such as a deformed shape of the SMA wire), or to allow the wire to expand in response to spring force supplied by a spring element. In either case, the locking mechanism 104 attached to the SMA wire may actuate among a plurality of positions, e.g., at least between first position 118 and second position 120. Moreover, in an example, actuator 102 may also be configured to control the actuation element to modulate the heat source in an attempt to substantially maintain a temperature of the SMA wire to cause the wire to maintain its phase, shape, etc., e.g., to maintain first position 118 or second position 120.

In one example, electrical control function 116 can detect an event for determining to actuate the locking mechanism to move to one of the first position 118 or the second position 120. For example, detecting the event may correspond to detecting activation of a switch or other mechanical or electromechanical feature of an actuated locking device 100, device, etc., and/or the like.

In method 200, at action 204, movement of the locking mechanism can be limited to one of the first position or the second position in response to contacting a surface of a body of a hardstop switch, wherein at least the surface of the body comprises an electrically conductive material. For example, hardstop switch 106 may be positioned relative to locking mechanism 104 such that conductive surface 108 of the body of hardstop switch 106 resists further movement of locking mechanism 104, e.g., either at the first position 118 or at the second position 120 (note: FIG. 1 illustrates the second position 120). In particular, for example, the locking mechanism 104 may contact conductive surface 108 of the hardstop switch 106. In an aspect, at least conductive surface 108 and, optionally, the entire body of hardstop switch 106, is formed from an electrically conductive material, such as but not limited to a metal, an electrically conductive rubber, etc.

In method 200, at action 206, completion of an electrical circuit can be detected at a hardstop switch caused by the locking mechanism contacting the surface of the hardstop switch at one of the first position or the second position 120. For example, hardstop switch 106, e.g., in conjunction with processor 112, memory 114, and/or electrical control function 116, may detect completion of the electrical circuit at the hardstop switch (e.g., hardstop switch 106) caused by the locking mechanism (e.g., locking mechanism 104) contacting the hardstop switch at one of the first position 118 or the second position 120. For example, the locking mechanism 104 may contact a conductive surface 108 of the hardstop switch 106, which can complete the electrical connection. In an example, locking mechanism 104 may also be composed of an electrically conductive material and may be connected to a system ground of a device (e.g. a chassis ground of the device), such to allow completion of the electrical circuit at the hardstop switch to activate the switch. Processor 112 and/or electrical control function 116 may detect activation of the hardstop switch 106 in this regard. Accordingly, various configurations of the hardstop switch 106 are possible, examples of which are described herein, as at least a portion of a body the hardstop switch 106 can be electrically conductive, while the hardstop switch 106 may not require tolerances typically associated with separate mechanical hardstops and electrical switches.

In method 200, at optional (as indicated by dashed lines) action 208, actuation of the locking mechanism can be maintained at the one of the first position 118 or the second position 120 based at least in part on detecting completion of the electrical circuit. For example, actuator 102, e.g., in conjunction with processor 112, memory 114, and/or electrical control function 116, can maintain actuation of the locking mechanism (e.g., locking mechanism 104) at the one of the first position 118 or the second position 120 based at least in part on detecting completion of the electrical circuit. As described, for example, where the actuator 102 includes a SMA wire, maintaining actuation of the locking mechanism 104 at action 206 may include maintaining a phase or shape of the SMA wire by modulating an electrical signal applied to, and hence a temperature of, the SMA wire in an attempt to substantially maintain the temperature of the SMA wire, and thus electrical contact of the locking mechanism 104 to the hardstop switch 106. In one example, electrical control function 116 and/or actuator 102 may include known electrical signal versus SMA wire phase change relationships (e.g., turn the signal on and/or off for certain amounts of time to obtain or maintain a certain amount of phase change) that enable electrical control function 116 via processor 112 to modulate the electrical signal supplied to the SMA wire to cause and/or maintain contact of locking mechanism 104 with conductive surface 108 of hardstop switch 106. In another example, actuator 102 may include a thermistor to determine or receive an ambient temperature near the SMA wire, such that the actuator can determine/control an amount of power of the electrical signal supplied to the SMA wire based on the ambient temperature (e.g., less power/current for higher temperatures as compared to lower temperatures), which allows for a more consistent rate of deforming the SMA wire. In another example, actuator 102 can increase the temperature of the SMA wire when the electrical contact between the locking mechanism 104 and the hardstop switch 106 begins to degrade or otherwise ceases and electrical control function 116 wants to maintain the electrical contact. Thus, actuation of the locking mechanism 104 can be maintained in this regard. For example, this can cause the locking mechanism 104 to remain in the locked or unlocked state defined by the first position 118 or the second position 120 in which actuation of the locking mechanism 104 is maintained.

In method 200, at optional (as indicated by dashed lines) action 210, the locking mechanism can optionally be actuated to move to the other one of the first position 118 or the second position 120. For example, actuator 102, e.g., in conjunction with processor 112, memory 114, electrical control function 116, etc., can actuate the locking mechanism (e.g., locking mechanism 104) to move to the other one of the first position 118 or the second position 120 (e.g., the opposite position with respect to the position obtained in action 204). In one example, electrical control function 116 can detect an event for determining to actuate the locking mechanism to move to the other one of the first position 118 or the second position 120. For example, detecting the event may correspond to detecting an expiration of a period of time (e.g., 5 seconds) after completion of the electrical circuit is initially detected, detecting activation of a switch or other mechanical or electromechanical feature (e.g., based on a user input) of actuated locking device 100, device, etc., and/or the like. Moreover, in the specific example above, actuating the locking mechanism 104 to move to the other one of the first position 118 or the second position 120 may include controlling the actuation element, e.g., the electrical signal supplied to the SMA wire, to reduce a temperature of the SMA wire causing the SMA wire to expand (e.g., from the second phase towards the first phase) and/or allowing a spring element to apply sufficient spring force to allow movement to or toward the other position.

For example, actuator 102 may include other mechanical or electromechanical features with an elasticity property to actuate the locking mechanism 104 to the other one of the first position 118 or the second position 120, such as a spring element attached to the locking mechanism 104. For example, when the SMA wire contracts and pulls the locking mechanism 104 to the one of the first position 118 or the second position 120, the spring element can stretch and hold a spring force. When the SMA wire expands, the spring element can apply the spring force, thereby compressing the spring element and pulling the locking mechanism 104 towards the other one of the first position 118 or the second position 120.

Figure 3:
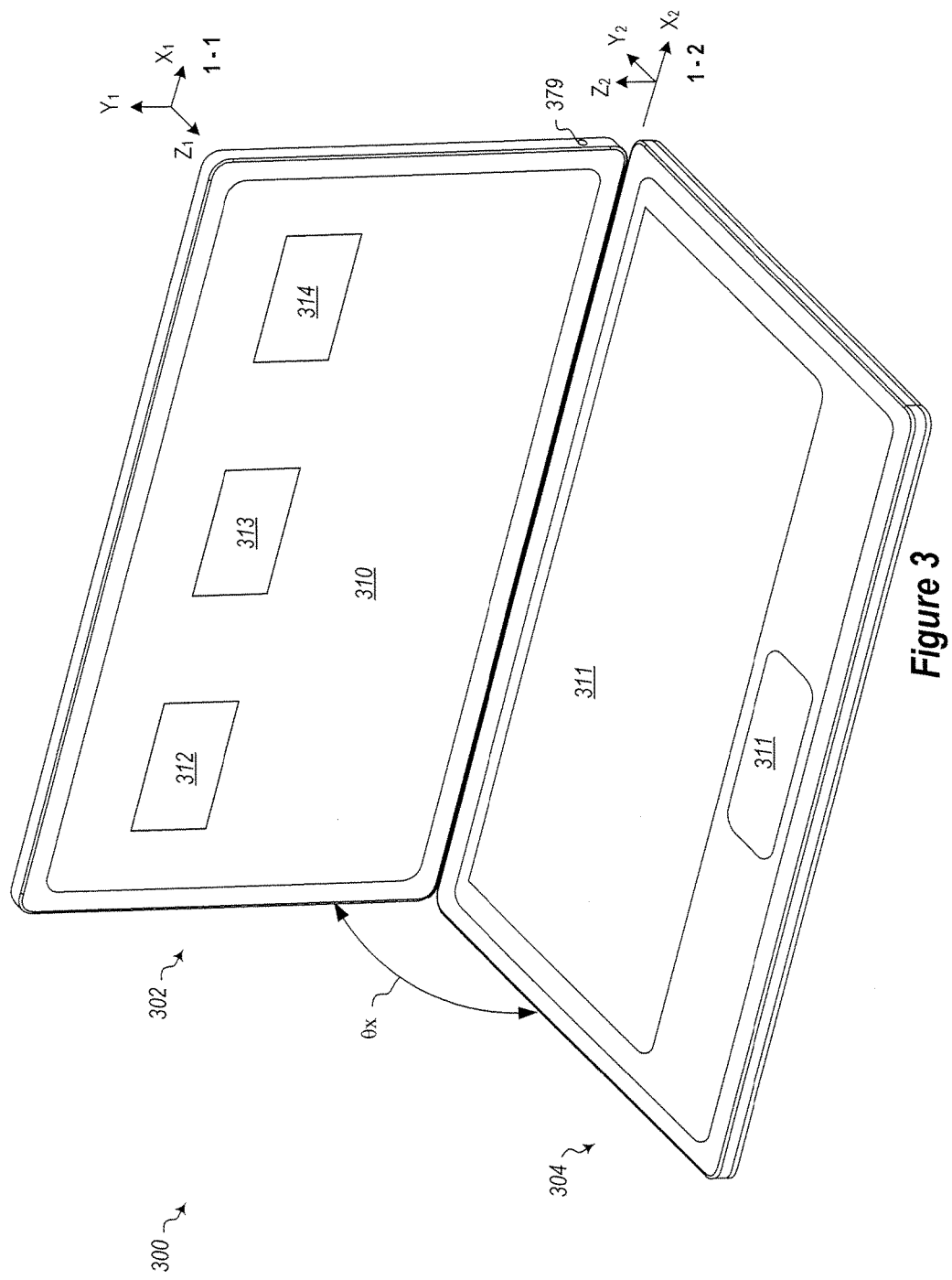
FIG. 3 is an isometric view of an example of a computing device that includes an actuated locking device in accordance with aspects described herein.
Figure 4:
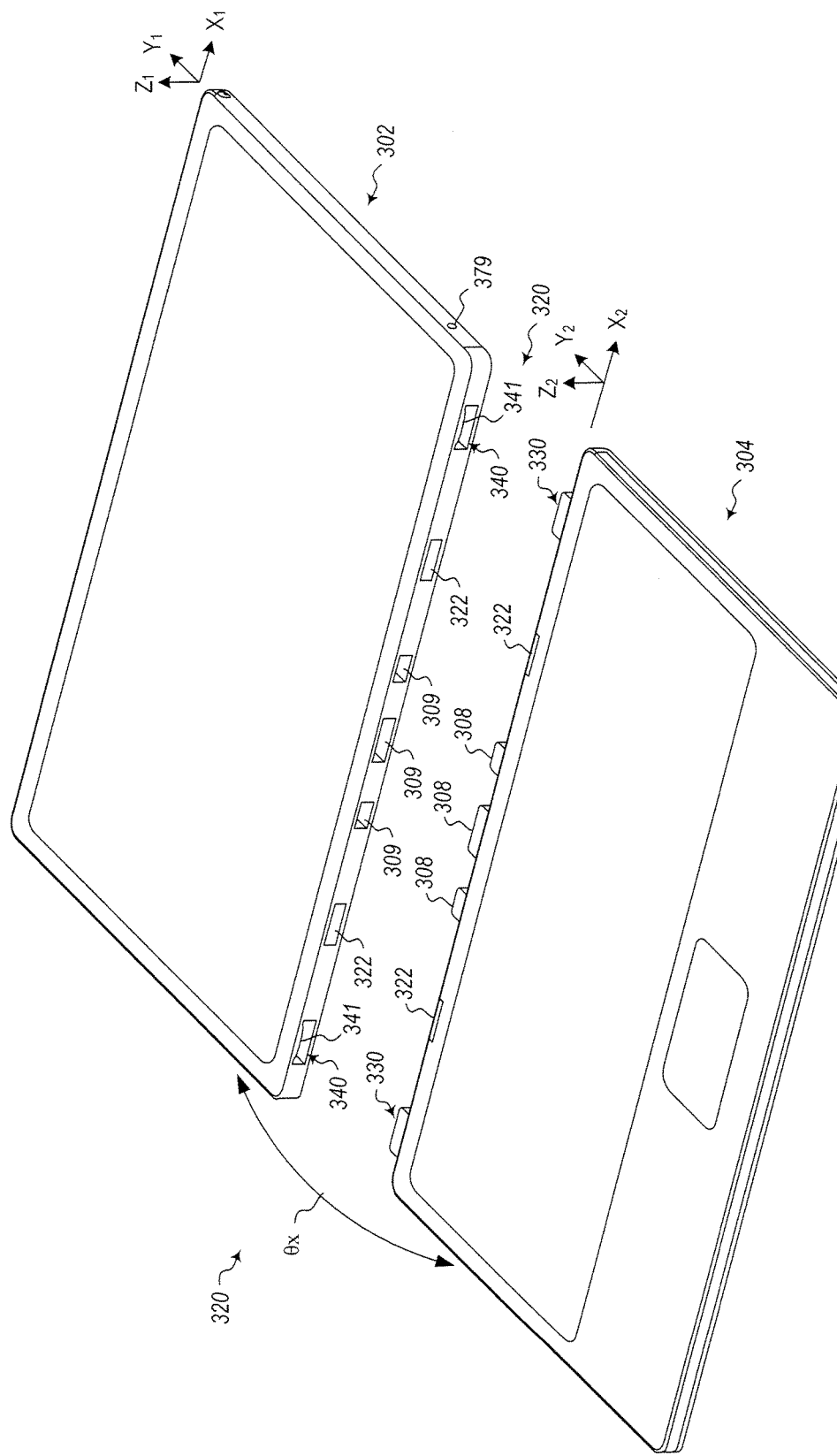
FIG. 4 is an isometric perspective view of the example of the computing device in FIG. 3 with portions separated from one another.

FIG. 3 is an isometric view of an example of a computing device 300 having connected and/or locked portions, and FIG. 4 is an isometric perspective view of the computing device 300 in FIG. 3 having separated portions, where computing device 300 may employ one or more locking systems 320, which may be considered an example implementation of actuated locking device 100, in accordance with aspects described herein to lock and unlock the portions. Referring generally to the computing device 300 shown in FIGS. 3 and 4, the computing device 300 may include a first portion 302 and a second portion 304. The first portion 302 may be separably connected to the second portion 304 by one or more locking systems 320 (see FIG. 4). For example, the first portion 302 may be mechanically connected to the second portion 304 in a docked (and/or locked) configuration by locking of the one or more locking systems 320, such as the docked configuration shown in FIG. 3. The first portion 302 may transition from the docked configuration to an undocked configuration, such as the undocked configuration shown in FIG. 4, by unlocking the one or more locking systems 320. The first portion 302 and the second portion 304 may transition from the connected to the undocked configuration and from the unconnected to the docked configuration.

In one aspect, which should not be construed as limiting, the locking system 320 may include a locking protrusion 330 and a locking receptacle 340 (shown in FIG. 4), which may be considered part of locking mechanism 104 in this example implementation. Although illustrated on a respective one of first portion 302 and second portion 304 of computing device 300, it should be understood that in other implementations the location of locking protrusion 330 and locking receptacle 340 may be switched. The locking receptacle 340 may include an aperture 341 through which the locking protrusion 330 may be inserted. Further, for example, locking system 320 may include a carrier 550 (not visible in FIGS. 3 and 4; see FIGS. 5, 8-1, 8-2, and 8-3) as part of locking mechanism 104 described previously, such that at least a portion of carrier 550 engages with locking protrusion 330 within locking receptacle 340. For example, additional aspects of locking system 320, which can be one example implementation of actuated locking device 100, are described below with respect to FIGS. 5 and 6.

Referring back to FIGS. 3 and 4, by way of orientation, a first coordinate system 1-1 (including the x1-direction, the y1-direction, and the z1-direction) is provided for the first portion 302 and a second coordinate system 1-2 (including the x2-direction, the y2-direction, and the z2-direction) is provided for the second portion 304. In the illustrated configuration, these coordinate systems 1-1, 1-2 are rotated about their respective x-axes. When the angle (θx) between the first portion 302 and the second portion 304 is one-hundred and eighty degrees, the x1 and x2 axes are parallel, the y1 and the y2 axes, and the z1 and the z2 axes are parallel. When the angle (θx) between the first portion 302 and the second portion 304 is ninety degrees, the x1 and x2 axes are parallel, the y1 and the z2 axes are parallel, and the z1 and the y2 axes are parallel (but opposite (e.g., positive values extending in opposite directions)). For ease of description, front is the positive z-direction, back is the negative z-direction, top is the positive y-direction, bottom is the negative y-direction, right is the positive x-direction, and left is the negative x-direction. Although not shown in the remaining figures, similar orientation will be used for ease of description.

The first portion 302 may include a display 310. The display 310 may be a touch sensitive display screen. The second portion 304 may include an input device 311. The input device 311 may include a keyboard, touchpad, one or more buttons, other input devices, or combinations thereof that may be used to provide input to the processor 312. Although a hybrid computing device is shown, the aspects described herein may be used with other computing devices where two portions are separably connected together. For example, the first portion 302 may be a mobile phone and the second portion 304 may be a cover, a keyboard, or other device. In other examples, the docking mechanisms described herein may be used in a non-computing environment.

Although FIG. 3 and FIG. 4 illustrate the display 310 of the first portion 302 and the input device 311 of the second portion 304 as facing each other (e.g., both being on the front side of their respective portions), in at least one embodiment described herein, the first portion 302 and second portion 304 may be reversible. For example, the first portion 302 may connect to the second portion 304 as shown (e.g., with the display 310 facing the front) and may be undocked, rotated 180 degrees, and docked to the second portion 304 such that the first portion 302 faces the opposite direction (e.g., with the display 310 facing the back). Thus, the locking system 320 may be configured to allow a reversible connection between the first portion 302 and the second portion 304.

The first portion 302 and/or the second portion 304 may include a processor 312 (which may be similar to or the same as processor 112), memory 313 (which may be similar to or the same as memory 114), a battery 314, other computing components, or combinations thereof. Thus, in an example, processor 312 may include, be coupled to, or otherwise implement or execute electrical control function 116 to control actuator 102 for locking and unlocking of locking system 320, as described herein. For example, as shown, the first portion 302 may include a processor 312, memory 313, and a battery 314 while the second portion 304 may also include a processor 312. In some embodiments, only one of the first portion 302 or the second portion 304 may include a processor 312. In other embodiments, both of the first portion 302 and the second portion 304 include a processor 312. In further embodiments, one or more computing components (e.g., processors 312, memory 313, and battery 314) may be included in the first portion 302 and/or the second portion 304 in any combination.

The computing components in the second portion 304 may be in electronic communication with one or more of the computing components in the first portion 302. For example, as shown in FIG. 4, the first portion 302 and the second portion 304 may be in electronic communication via a physical electrical connector that includes an electrical protrusion 308 and an electrical receptacle 309.

As shown in FIG. 4, one or more electrical protrusions 308 are located on the second portion 304 and one or more electrical receptacles 309 are located on the first portion 302. In other embodiments, one or more electrical receptacles 309 are located on the second portion 304 and one or more electrical protrusions 308 are located on the first portion 302. In further embodiments, the first portion 302 and the second portion 304 may include one or more electrical receptacles 309 and one or more electrical protrusions 308, such that each of the first portion 302 and second portion 304 may include a combination of electrical receptacles 309 and electrical protrusions 308.

The electrical protrusions 308 and/or electrical receptacles 309 may include various electrical connections. As shown, the electrical protrusions 308 and electrical receptacles 309 include multiple pin connectors. In embodiments where computing components (e.g., the processor 312, memory 313, or battery 314) are on separate portions (e.g., first portion 302 and second portion 304), maintaining electrical communication between the first portion 302 and the second portion 304 may be important. For example, if a computing component on the second portion 304 were to lose electrical communication with an electrical component on the first portion 302, the computing device 300 may fail (e.g., an operating system may crash or a computing component may be affected by a power surge when the electrical connection is restored). Some electrical connections may be sensitive (e.g., high speed).

Thus, in some embodiments, it may desirable for the first portion 302 and the second portion 304 to be securely connected together in the docked configuration by locking system 320. In particular, the locking system 320 may include carrier 550 movable to engage locking protrusion 330 within the aperture 341 of the locking receptacle 340. Additionally, in some aspects, locking system 320 may further include a magnet 322, which is described in more detail below. Furthermore, in some embodiments, it may be desirable for a computing component (e.g., the processor 312, memory 313, or battery 314) in the second portion 304 to hand off its responsibilities to a computing component (e.g., the processor 312, memory 313, or battery 314) on the first portion 302 (and/or vice versa) before undocking from the first portion 302.

The computing device 300 may include one or more locking protrusions 330. As illustrated in FIG. 4, the computing device 300 may alternatively include two (or more) locking systems 320 (e.g., within two (or more) locking receptacles 340 for contacting two (or more) locking protrusions 330). In other embodiments, more or fewer locking systems 320 may be used. For example, a single locking system 320 may be used. The locking system 320 may incorporate both a single locking protrusion 330 and one or more components of one or more electrical protrusions 308 into the single locking protrusion 330 to be inserted into a single locking receptacle 340 that includes one or more components of one or more electrical receptacles 309 (e.g., the locking mechanism 504 partially shown in FIG. 5).

Computing device 300 may include one or more locking receptacles 340 on the first portion 302 and one or more locking protrusions 330 on the second portion 304. In other embodiments, the first portion 302 and the second portion 304 may each include one or more locking protrusions 330 and corresponding one or more locking receptacles 340. In other words, the first portion 302 may include a first locking protrusion 330, a second locking receptacle 340, and a third locking protrusion 330 and the second portion 304 may include a first locking receptacle 340 corresponding to the first locking protrusion 330 on the first portion 302, a second locking protrusion 330 corresponding to the second locking receptacle 340 on the first portion, and a third locking receptacle 340 corresponding to the third locking protrusion 330 on the first portion. More and/or fewer combinations of locking protrusions 330 or locking receptacles 340 (e.g., only locking protrusions 330 or locking receptacles 340 on each portion or combinations of locking protrusions 330 or locking receptacles 340 on each portion) may be used.

Figure 5A:
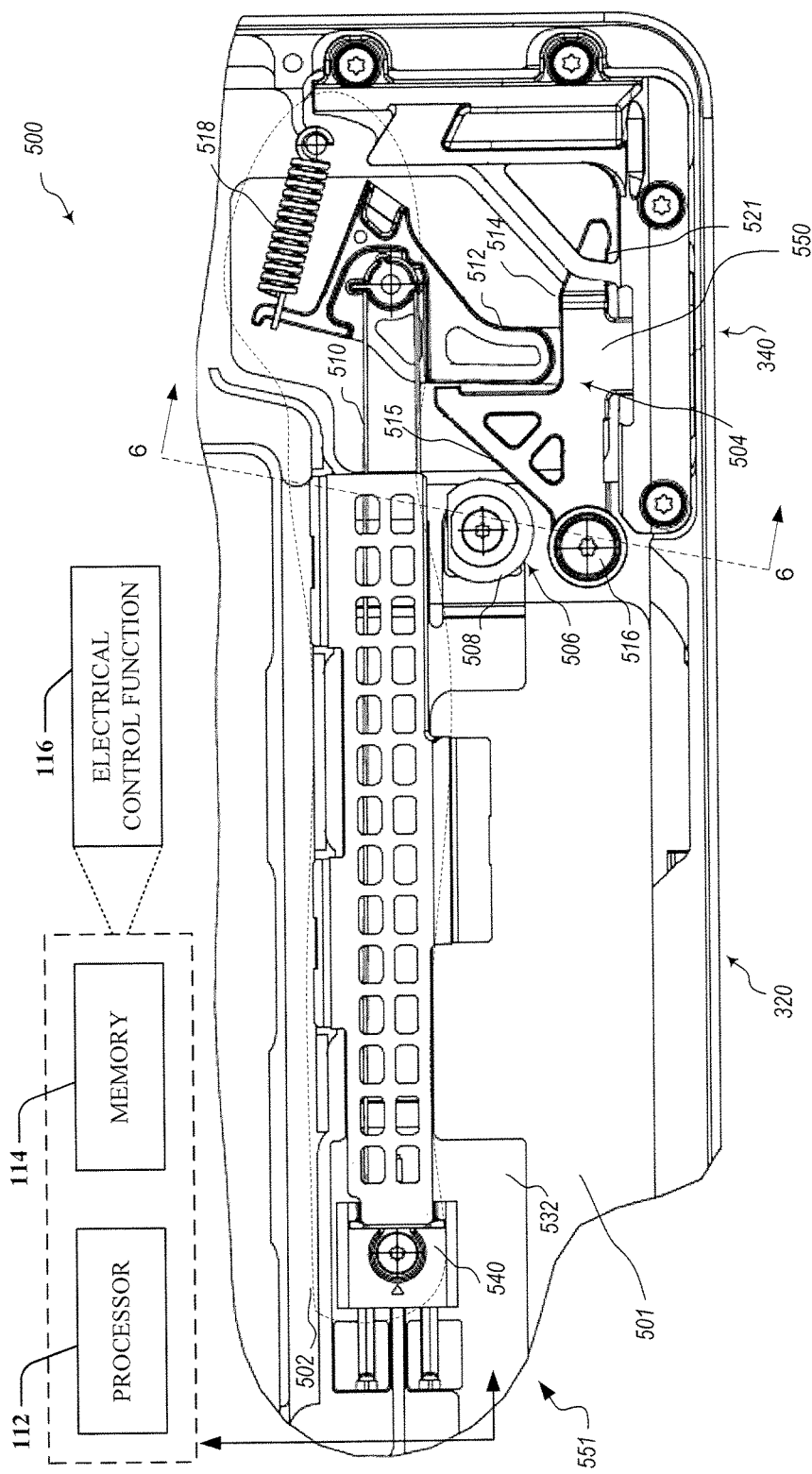
FIG. 5A is a front partial cutaway view of a portion of the example of the computing device of FIG. 3, wherein the portion employs an example actuated locking device in a first state in accordance with aspects described herein.
Figure 5B:
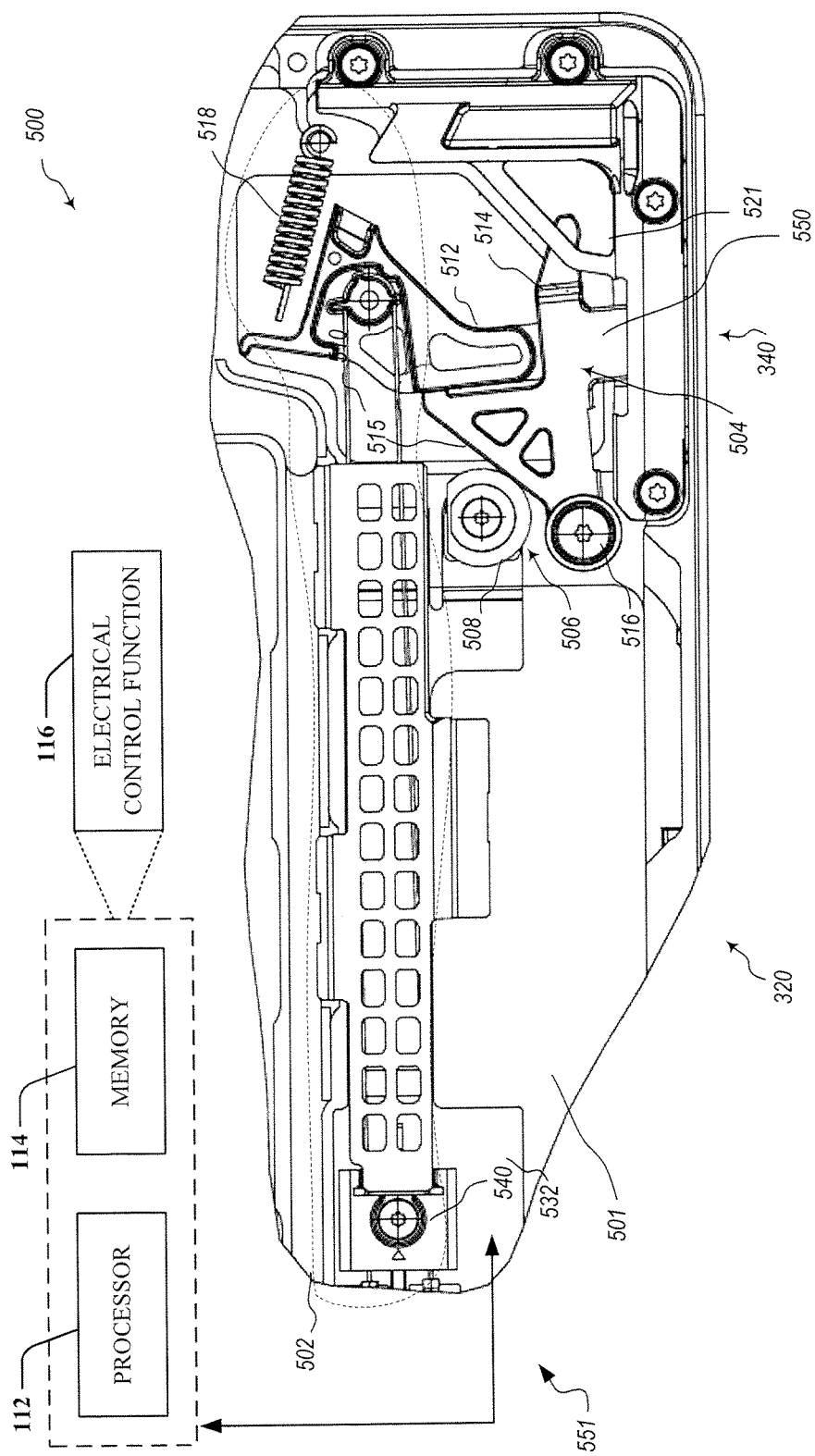
FIG. 5B is a front partial cutaway view of a portion of the example of the computing device of FIG. 3, wherein the portion employs an example actuated locking device in a second state in accordance with aspects described herein.
Figure 6:
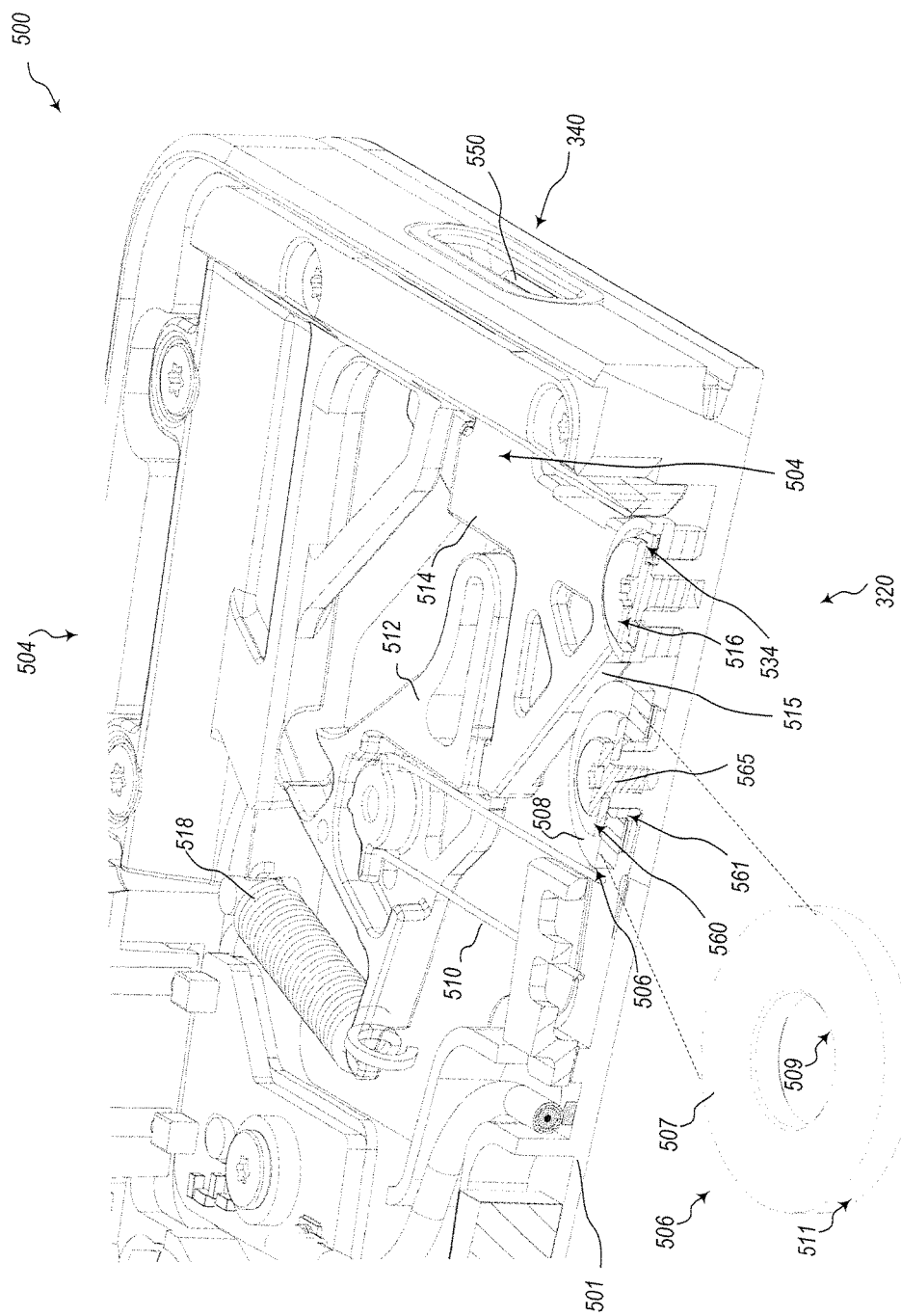
FIG. 6 is a perspective partial cutaway view of the portion of the example of the computing device including the actuated locking device of FIG. 5.

FIG. 5A is a cutaway front view of an example of a portion 500 of a computing device (e.g., first portion 302 or second portion 304 of computing device 300) including a portion of locking system 320 in a first state. FIG. 5A is a cutaway front view of an example of a portion 500 of a computing device (e.g., first portion 302 or second portion 304 of computing device 300) including a portion of locking system 320 in a second state. FIG. 6, which is described in conjunction with FIGS. 5A and 5B, is a partial cutaway perspective view, partial cross-sectional view along line 6-6 of FIG. 5A, of a portion of locking system 320 used in the portion 500 of the computing device 300. Further, shown in FIG. 6, is an exploded view of a hardstop switch 506, which is one example of hardstop switch 106 of FIG. 1. As described further herein, portion 500 may include or implement at least a portion of an actuated locking device (e.g., actuated locking device 100) in the example implementation of locking system 320, as described herein. This portion of locking system 320 includes an actuator 502, which may be an example implementation of actuator 102. In this example, actuator 502 includes, at least, a SMA wire 510 wound partially about a post of a first member 512 of locking mechanism 504 and held in place at a wire crimp block 540. In this case, locking mechanism 504 is an example implementation of locking mechanism 104. Further, actuator 502 includes a spring element 518 connected to an extension of first member 512, etc. Further, for example, this portion of locking system 320 can also include a hardstop switch 506, which may be an example implementation of hardstop switch 106, with a body defining an electrically conductive surface 508 for detecting contact of the locking mechanism 504 with the hardstop switch 506. In portion 500, the locking mechanism 504 may be actuated by SMA wire 510 (e.g., a nitinol wire) controlled by actuator 502. For example, the SMA wire 510 may be controlled by the actuator 502 to contract, which can cause first member 512 (e.g., a rocker arm) to forcibly pivot a second member 514 (e.g., a lever arm) of locking mechanism 504, where the second member 514 can include a locking extension, referred to herein as a carrier 550, which can contact locking protrusion 330 positioned within the aperture 341 of the locking receptacle 340 of portion 500 (e.g., first portion 302 or second portion 304) of the computing device 300, as described in FIGS. 3 and 4. As such, for example, contact from the first member 512 can cause the second member 514 to pivot on a post 516 and rotate locking mechanism 504 relative to locking receptacle 340 (e.g., away from locking protrusion 330 that may be positioned in the aperture 341 of the locking receptacle 340). The post 516, for example, can be part of or can be fixed to a chassis 501 of the portion 500.

In other words, to achieve an unlocked state of locking mechanism 504, for example, actuator 502 can actuate the locking mechanism 504 to pull first member 512 into second member 514 (e.g., and/or pull first member 512 and second member 514 together where connected), causing the locking mechanism 504 to move from a first position (e.g., in a locked state with carrier 550 extended into the aperture 341 of the locking receptacle 340) towards a second position (e.g., for an unlocked state). In an example, actuator 502 can begin actuation of the locking mechanism 504 to achieve the unlocked state based on a detected event (e.g., activation of a switch or button on the computing device 300, such as a key on a keyboard or other button intended for unlocking and releasing the portion 500 from another portion of the computing device or other device, dock, etc.).

More specifically, in this example implementation, second member 514 having a side surface 515 may be coupled to the first member 512. With side surface 515 starting in a first position, as shown in FIG. 5A, which may correspond to the locked state, actuation of actuator 502 pulls the first member 512, causing a rotating action of the second member 514 pivoting on post 516. Actuator 502 can continue actuating the locking mechanism 504 at least until surface 515 of the second member 514 contacts the conductive surface 508 of the hardstop switch 506 at the second position, as shown in FIG. 5B, which may correspond to the unlocked state, which moves carrier 550 at least partially away from (e.g., move partially out of the aperture 341 of) locking receptacle 340. In an example, however, the first position shown in FIG. 5A may be the unlocked state (or another state) and the second position shown in FIG. 5B may be the locked state (or another state).

In either case, in this example, the hardstop switch 506 may have an annular body with parallel top and bottom surfaces, and a substantially perpendicular conductive surface 508 that defines a side surface of hardstop switch 506. Further, in this example, the second member 514 of the locking mechanism 504 may include a planar body having at least one substantially perpendicular side surface defined by surface 515. As such, the contact surface between the conductive surface 508 of hardstop switch 506 and the surface 515 of the second member 512 may define a line, or a rectangular area (e.g., depending on the elasticity of the respective surfaces and bodies), or a curvilinear rectangular surface. It should be understood, however, the locking mechanism 504 and hardstop switch 506 may take any form that allow for electrical conductivity between them, and where the surface 515 of the second member 512 defines a limit of movement, e.g., at least one position, for the locking mechanism 504.

Further, in an example, the post 516 can be coupled to an electrical ground, such as an electrical ground of a chassis 501 of portion 500 such to allow detection of completion of an electrical circuit when the surface 515 of the second member 514 of the locking mechanism 504, which can also be conductive, contacts the conductive surface 508 of the hardstop switch 506 and the signal goes to ground. For example, the post 516 may include a pivot screw that attaches to chassis 501 of the portion 500. Additionally, the post 516 may include or otherwise be coupled to a spring element 534, such as a wave washer, an electrically-conductive elastomeric material, a spring, etc., under the pivot screw to maintain electrical ground.

Moreover, in an example, actuator 502 may further include an actuation element 551 defined or otherwise controlled by processor 112 and/or memory 114 executing electrical control function 116 and circuitry 532 (e.g., a printed circuit board (PCB)), which can provide electronic communications for controlling the actuator 502. For instance, circuitry 532 of the actuation element 551 can be electrically connected to hardstop switch 506 to obtain signals therefrom (e.g., such as signals when the electrical circuit is completed at the hardstop switch 506). For example, electrical control function 116 can control actuator 502 and/or detect completion of the electrical circuit at the hardstop switch 506 by communicating signals to/from the actuator 502 and/or the hardstop switch 506 via the circuitry 532. As described, for example, when completion of the electrical circuit is detected at the hardstop switch 506, electrical control function 116 can cause actuator 502 to maintain the actuation of the locking mechanism 504 to hold the locking mechanism 504 in the second position (e.g., the unlocked state, wherein the surface 515 of second member 514 maintains contact with the conductive surface 508 of hardstop switch 506). In an aspect, electrical control function 116 can cause actuator 502 to hold the locking mechanism 504 in the second position for a time period corresponding to an amount of time estimated or allowed for a user to detach portion 500 from another portion (or vice versa).

Further, for example, actuation element 551, such as processor 112 and/or memory 114 executing electrical control function 116, can supply an electrical signal via one or more electrical circuits the circuitry 532 to the SMA wire 510 to cause SMA wire 510 to change shapes. For instance, in this case, the electrical signal applied to the SMA wire 510 creates heat due to the internal resistance in the SMA wire 510. As such, the actuation element 551 may generate a heat source. The generated heat increases a temperature of the SMA wire 510 to cause the SMA wire 510 to contract, thus actuating the locking mechanism 504, until the locking mechanism 504 contacts the hardstop switch 506. In this example, wire crimp block 540 holds the ends of the SMA wire 510 in a fixed position, and also includes or is connected to electrical contacts or other electrical connectors in electrical communication with the SMA wire 510. Further, such electrical contacts or other electrical connectors of wire crimp block 540 may also be in contact with circuitry 532. As such, the electrical signal generated and controlled by processor 112 and/or memory 114 executing electrical control function 116 may be conducted via circuitry 532 through the wire crimp block 540 to the SMA wire 510.

In addition, in an example, actuation element 551 can modulate the electricity supplied to, and hence the temperature of, the SMA wire 510 to maintain the SMA wire 510 at a substantially constant temperature to cause the SMA wire 510 to substantially maintain its present length or shape, such to keep the locking mechanism 504 actuated (e.g., in the unlocked position). In a specific example, actuation element 551 can determine a power or current of the electrical signal supplied to the SMA wire 510 based on an ambient temperature near the actuation element 551 or SMA wire 510. For example, actuation element 551 may include a thermistor to measure the ambient temperature, and may determine a power or current of an electrical signal to apply to the SMA wire 510 based on the ambient temperature. In an example, the actuation element 551 may use less power when the ambient temperature achieves a threshold temperature. For example, the actuation element 551 may use a mapping between ambient temperatures and electrical power supplied to determine the electrical power. This allows heating of the SMA wire 510 at a substantially consistent rate regardless of ambient conditions, which can allow for substantially consistent deformation of the SMA wire 510. As noted above, actuation element 551 may maintain actuation of the locking mechanism 504 for a period of time and/or until detection of another event (e.g., activation of a switch or button on the computing device, etc.), at which time actuation element 551 may actuate the locking mechanism 504 to enter a locked state, as described below.

To achieve a locked state of locking mechanism 504, for example, actuator 502 can actuate the locking mechanism 504 to cause first member 512 to be pulled away from the second member 514, which may cause second member 514 to pivot on post 516 such to lower the carrier 550 of the locking mechanism 504 further into the aperture 341 of the locking receptacle 340. In other words, moving to the locked state, in this example, involves movement of the locking mechanism 504 from a second position to a first position, e.g., corresponding to movement of the surface 515 of the second member 514 from the second position (as in FIG. 5B) to the first position (as in FIG. 5A). Moreover, in the locked state, the locking mechanism 504, and more specifically the carrier 550, can contact locking protrusion 330 when the locking protrusion 330 enters the aperture 341 of the locking receptacle 340, as described above. In this aspect, for instance, the carrier 550 may engage the locking protrusion 330 to create a force fit within the aperture 341 of the locking receptacle 340.

In this example, the actuation element 551 may further include a spring element 518 coupled to the first member 512 such that the spring element 518 expands (e.g., stretches) when the first member 512 is pulled into the second member 514. Accordingly, when the actuation element 551 begins to release the contraction of the SMA wire 510 (e.g., expand the SMA wire 510), the spring force of the expanded spring element 518 can cause the first member 512 to return to a first position and push the second member 514 to pivot on the post 516 (e.g., so that the locking protrusion defined by carrier 550 lowers further into the aperture 341 of the locking receptacle 340, and/or until a portion of the first member 512 or the second member 514 contacts a limiting surface 521 on the chassis 501 or locking receptacle 340 connected to the chassis 501). In other words, the actuation element 551 causes movement of the locking mechanism 504 that moves the surface 515 of the second member 514 from the second position (as in FIG. 5B) to the first position (as in FIG. 5A). For example, the actuation element 551 can control the electrical signal to the SMA wire 510 (e.g., remove electricity causing the heat source), and thus lower a temperature of the SMA wire 510, to cause expansion of the SMA wire 510 by removing the contraction force of the actuated SMA wire 510 that opposes the spring force of the spring element 518. This can cause the stretched spring element 518 to compress and pull the first member 512 against an opposing surface of the second member 514, causing the second member 514 to pivot on post 516 and move away from the hardstop switch 506.

As shown in FIG. 6, at least a portion of hardstop switch 506 can include a washer-shaped member that has an annular shaped body 507 with an external side wall 511 and/or an internal side wall 509 defining a through-hole. Moreover, hardstop switch 506 can be composed of a metal, conductive rubber, etc.

Additionally, portion 500 can include electrically isolated parts 560 and 561 that can be coupled by the hardstop switch 506, such that hardstop switch 506, when brought to electrical ground based on contact by the second member 514, causes the hardstop switch 506 to complete the electrical circuit between the electrically isolated parts 560. For example, the electrically isolated parts 560 and 561 may be connected to the circuitry 532 to allow for detecting the electrical coupling at the electrically isolated parts 560, based on which actuator 502 maintains actuation of the locking mechanism 504, as described. For example, electrically isolated parts 560 and 561 may be formed of any electrically-conducting material. Further, for example, in this implementation electrically isolated part 560 may have a washer-like shape, while electrically isolated part 561 may have a cylindrical body with an extending annular flange. The shape of electrically isolated parts 560 and 561 allows part 561 to be assembled onto a post 516 extending from chassis 501, hardstop switch 506 to be placed on top of part 561, and removable fastener 565 placed over part of the top surface of hardstop switch 506 such that the assembly can be fixed in position by a removable fastener 565 being secured into chassis 501. As such, electrically isolated parts 560 and 561 are sized to at least partially contain hardstop switch 506 in a spaced apart relationship with chassis 501.

Figure 7:
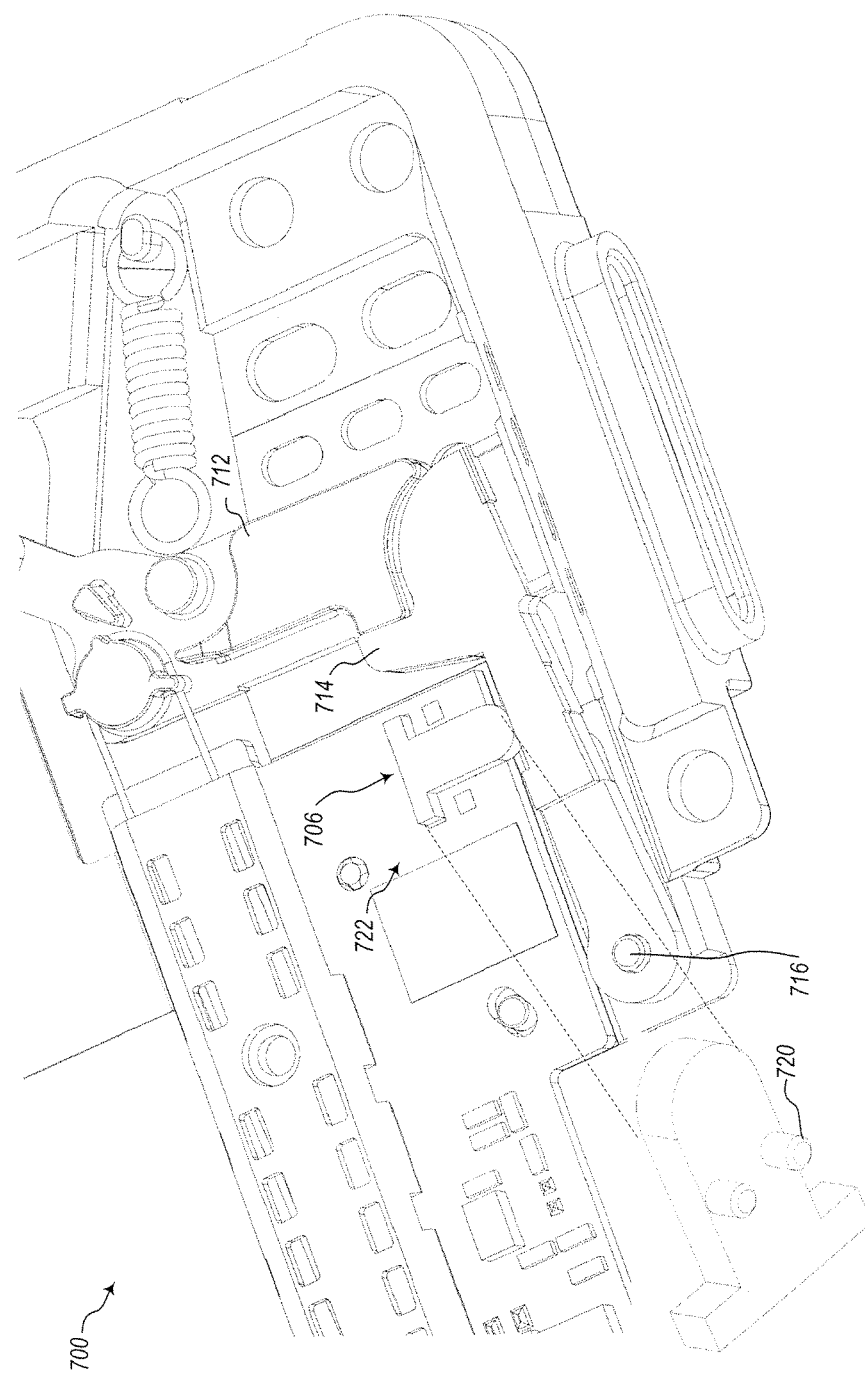
FIG. 7 is a perspective partial cutaway view of the example of a portion of the computing device of FIG. 3 that employs another example of the actuated locking device in accordance with aspects described herein.

FIG. 7 illustrates another example of the many potential configurations of a hardstop switch 706 (similar to hardstop switch 106) according to the present aspects. Also, FIG. 7 includes another example of the many potential configurations of a locking mechanism 704 (similar to locking mechanism 104) according to the present aspects. In this case, a part of a portion 700 of a computing device (such as computing device 300) includes the locking mechanism 704 having a first member 712 movably coupled to a second member 714, where the second member 714 can pivot on a post 716 and contact the hardstop switch 706 when the locking mechanism 704 is actuated to an unlocked state. In this example, the hardstop switch 706 can include one or more pins 720 that can be mounted to or fit into corresponding holes through another member 722 of portion 700. In one example, member 722 may be a circuit board (e.g., circuitry 532) that can be coupled to processor 112 (which may execute electrical control function 116) to control an actuator (e.g., including an SMA wire, not shown). As such, these components detect completion of the electrical circuit when second member 714, which may be coupled to a chassis ground, contacts a conductive surface 708 of the hardstop switch 706. For example, hardstop switch 706 may be soldered to the member 722 at points where completion of the electrical circuit can be detected by the member 722.

It should be noted that the above implementations should not be construed as limiting. It is to be appreciated that the hardstop switch 106, 506, 706, etc. can be of substantially any shape/profile, and can include a conductive surface to facilitate detecting completion of the electrical circuit when the locking mechanism contacts the hardstop switch 106, 506, 706, etc.

Referring back to FIGS. 3 and 4, a secure connection between the first portion 302 and the second portion 304 may include one or more of: a minimal gap between the first portion 302 and the second portion 304, a secure lock, minimal free play (i.e., backlash) about θx (e.g., about the axis extending between the connection of the first portion 302 and second portion 304), minimal free play (i.e., backlash) in the y-direction (e.g., along the axis from the top to the bottom of the first portion 302). In addition or in the alternative, in some embodiments it may be desirable for the insertion force required to insert the locking protrusion 330 into the locking receptacle 340 (including a lock, such as a rotating lock 860 of FIGS. 8-1, 8-2, and 8-3, as described below, and/or other locking components) to be minimal. In additional or alternative embodiments, it may be desirable to provide one or elements of a secure connection (e.g., a minimal gap, a secure lock, minimal free play about θx, minimal free play in the y-direction) and/or minimal required insertion force with minimal numbers of locking elements (e.g., locking protrusions 330) in each locking receptacle 340. For example, it may be desirable that only two locking elements be abutting (e.g., one locking protrusion 330 within a single locking receptacle 340).

In at least one embodiment, the gap (e.g., the distance in the y-direction between the first portion 302 and the second portion 304) between the first portion 302 and the second portion 304 in the docked configuration can be less than 0.1 mm. Having a gap less than 0.1 mm may be desirable for aesthetic and/or functional reasons. For example, for the electrical connection on the electrical protrusions 308 and the electrical connection on the electrical receptacles 309 to remain in contact, the gap should be small. In at least one embodiment described herein, a gap of 0.1 mm may be achieved while providing free play about θx of less than 1.5 degrees. The gap may be dependent on the type of locking system 320 used and/or the tolerances (e.g., the differences in the actual dimensions from the desired dimensions of the design) designed into the locking components of the locking system 320.

A secure lock can be the resistance of the locking system 320 to forces applied in the y-direction. For example, a secure lock may resist movement between the first portion 302 and the second portion 304 when a tension force is applied between the first portion 302 and the second portion 304. In some embodiments, the tension force may be resisted without losing electrical communication between the first portion 302 and the second portion 304. In some embodiments, the tension force may be resisted without plastically deforming locking components of the locking system 320. In some embodiments, the first portion 302 and the second portion 304 may be parallel (e.g., when the y1 and y2 axes are parallel). In other embodiments, the first portion 302 and the second portion 304 may be limited in rotation about θx.

In at least one embodiment, a single locking system 320 can be capable of resisting a tensile force of 57 millinewtons or less applied to the locking system 320 in the y-direction without moving (e.g., less than one micron of movement) in the y-direction. In at least one embodiment, a single locking system 320 can be capable of resisting a tensile force of 4 Newtons or less applied to the locking system 320 in the y-direction without substantial movement (e.g., less than 75 microns of movement) in the y-direction. In at least one embodiment, one locking protrusion 330 and one locking receptacle 340 can be capable of resisting a tensile force of 70 Newtons or less applied to the locking system 320 in the y-direction with minimal movement (e.g., less than 1 mm of movement) in the y-direction. In embodiments where magnets 322 are used, then there would be substantially no movement (e.g., not one or less than one micron of movement) in the y-direction until the force applied by the magnet 322 is overcome. For example, if the magnet 322 applied 16 Newtons of force in the y-direction, then, in at least one embodiment, a single locking protrusion 330 and locking receptacle 340 combination can be capable of resisting 16 Newtons force with no movement (e.g., not one micron of movement), 4 Newtons of force without substantial movement (e.g., less than 75 microns of movement), and 70 Newtons of force with minimal movement (e.g., less than 1 mm of movement) in the y-direction.

Free play (i.e., backlash) about θx is movement of the locking receptacle 340 with respect to the locking protrusion 330 in the θx direction when a force is applied to cause motion about the x-axis. For example, the top of the first portion 302 is pushed with a small force (e.g., 1 Newton), the free play of the entire computing device 300 is the amount of angular displacement (θx) about the hinge. It should be noted that the applied force and/or the free play about θx may be in either direction (e.g., in the positive or negative z-direction or θx direction). Thus, it may be desirable, in some embodiments, to reduce the amount of free play of the locking protrusion 330 about θx. The free play of the locking protrusion 330 about θx is different than the free play of the computing device 300 about θx. For example, the free play of the computing device 300 about θx may include the compliance of the entire first portion 302 (e.g., the materials that form the first portion), compliance of the entire second portion 304, and compliance and/or free play of a hinge as well as the locking protrusion 330. The free play of the locking protrusion 330 about θx is limited only to the components of the locking protrusion 330, locking receptacle 340, other locking elements of locking system 320 or combinations thereof.

In at least one embodiment, the free play about θx of the locking protrusion 330 is small. For example, in at least one embodiment, the free play about θx may be small (e.g., less than 1.5 degrees) when a 200 N-mm torque is applied in the positive or negative θx-direction. In at least one embodiment, the free play about θx may be minimal (e.g., less than 1 degree) when a 200 N-mm torque is applied in the positive or negative θx-direction. In at least one embodiment, the free play about θx may be substantially zero (e.g., less than 0.5 degrees) when a 200 N-mm torque is applied in the positive or negative θx-direction. In at least one embodiment, the free play about θx may be zero (e.g., less than 0.1 degrees) when a 200 N-mm torque is applied in the positive or negative θx-direction.

Free play (i.e., backlash) in the y-direction of the locking protrusion 330 is movement in the y-direction when a tensile force is applied in the y-direction. For example, the top of the first portion 302 and/or the bottom of the second portion 304 are pulled with a small force (e.g., 1 Newton), the free play of the locking protrusion 330 in the y-direction is the distance between the first portion 302 and the second portion 304. Free play in the y-direction differs from the gap described above in that free play in the y-direction is the static distance between the first portion 302 and the second portion 304 when locked. Free play in the y-direction is the distance that the first portion 302 and the second portion 304 are separated by when a small force (e.g., 1 Newton) is applied in the y-direction. In some embodiments, free play in the y-direction may interrupt electrical communication between the first portion and the second portion. In further embodiments, free play in the y-direction may affect the user experience. Thus, it may be desirable, in some embodiments, to reduce the amount of free play of the locking receptacle 340 with respect to the locking protrusion 330 in the y-direction. For example, in at least one embodiment, a single locking protrusion 330 can be capable of limiting travel to less than 75 microns of movement in the y-direction when a tensile force of 4 Newtons or less applied to the locking system 320 in the y-direction.

In at least one embodiment, the free play of the locking protrusion 330 in the y-direction is small (e.g., less than 0.5 mm) when a 1 Newton tensile force is applied in the y-direction. In at least one embodiment, the free play in the y-direction may be substantially zero (e.g., less than 18 microns) when a 1 Newton tensile force is applied in the y-direction. In at least one embodiment, the free play in the y-direction may be zero (e.g., less than 5 microns) when a 1 Newton tensile force is applied in the y-direction. In some embodiments, the free play in the y-direction may be less than between 5 microns and 0.5 mm.

The insertion force is the force required to insert the locking protrusion 330 into the locking receptacle 340. The insertion force is the force applied and can be exclusive of the force of gravity (e.g., the weight of the first portion 302) and/or magnetic forces (e.g., in embodiments that include magnets 322). The insertion force required to insert the locking protrusion 330 into the locking receptacle 340 such that the locking protrusion 330 is locked within the locking receptacle 340 may be sufficient to overcome friction between the locking protrusion 330 and the locking receptacle 340, to overcome forces applied against the locking protrusion 330 by other locking components (e.g., a rotating lock), other forces, or combinations thereof. In at least one embodiment, the insertion force applied may be small (e.g., less than 15 Newtons). In at least one embodiment, the insertion force may be very small (e.g., less than 6 Newtons). In at least one embodiment, the insertion force may be minimal (e.g., less than 2 Newtons). In at least one embodiment, the insertion force may be substantially zero (e.g., less than 1 Newton).

In embodiments where magnets 322 are used, the insertion force may be nearly zero (e.g., no force applied in the y-direction). For example, if the force applied by the magnet 322 in the y-direction is 16 Newtons (8 Newtons per magnet with two magnets) and the insertion force required may be 15 Newtons, the magnet 322 can actually pull the first portion 302 toward the second portion 304. In another example, where the first portion 302 and the second portion 304 are isolated such that the no forces are applied in the y-direction (e.g., the first portion 302 and the second portion 304 are placed in a mandrel) the magnetic force from the magnet 322 may pull the first portion 302 and the second portion 304 into the docked configuration before the locking protrusion 330 comes into contact with the locking receptacle 340. In other words, when the locking protrusion 330 is sufficiently close to the locking receptacle 340, the magnetic force of the magnet 322 may pull the locking protrusion 330 into the locking receptacle 340 without any other forces being needed.

In at least one embodiment described herein, the connection between a single locking protrusion 330 and a single locking system 320 can have a gap between the first portion 302 and the second portion 304 of less than 0.1 mm, is able to lock the first portion 302 to the second portion 304 while maintaining an electrical connection and allowing no more than 0.5 mm of motion under a tensile force of 28 Newtons, is capable of resisting a tensile force of 200 Newtons without separating the locking protrusion 330 from the locking receptacle 340, is capable of resisting a tensile force of 4 Newtons without moving more than 75 microns, has free play about θx of less than 0.1 degrees about the x-axis when a 200 N-mm torque is applied in the positive or negative θx-direction, has free play in the y-direction of less than 18 microns when a 1 Newton tensile force is applied in the y-direction, has a required insertion force of less than 5 Newtons in the y-direction, while only two locking elements abut within a single locking receptacle 340.

In at least one embodiment described herein, the connection between a single locking protrusion 330 and a single locking receptacle 340 has a gap between the first portion 302 and the second portion 304 of less than 0.5 mm, is capable of resisting a tensile force of 100 Newtons without separating the locking protrusion 330 from the locking receptacle 340, is capable of resisting a tensile force of 2 Newtons without moving more than 75 microns, has free play about θx of less than 1.5 degrees about the x-axis when a 200 N-mm torque is applied in the θx-direction, has free play in the y-direction of less than 500 microns when a 1 Newton tensile force is applied in the y-direction, has a required insertion force of less than 15 Newtons in the y-direction.

Although specific combinations of the various components of a secure connection (with or without specific insertion force values and/or specific numbers of locking components) are provided, any permutation of the various components of a secure connection (with or without specific insertion force values and/or specific numbers of locking components) are contemplated as being a part of the present disclosure. For example, at least one embodiment disclosed herein may only be capable of one of: having a gap between the first portion 302 and the second portion 304 of less than 0.5 mm, is capable of resisting a tensile force of 100 Newtons without separating the locking protrusion 330 from the locking receptacle 340, is capable of resisting a tensile force of 2 Newtons without moving more than 75 microns, resisting a tensile force of 28 Newtons without moving more than 0.5 mm, has free play about θx of less than 1.5 degrees about the θx-axis when a 200 N-mm torque is applied in the θx-direction, having free play in the y-direction of less than 500 microns when a 1 Newton tensile force is applied in the y-direction, having a required insertion force of less than 15 Newtons in the y-direction. In another example, at least one embodiment disclosed herein may only be capable of one of:

having a gap between the first portion 302 and the second portion 304 of less than 0.1 mm, is capable of resisting a tensile force of 200 Newtons without separating the locking protrusion 330 from the locking receptacle 340, is capable of resisting a tensile force of 4 Newtons without moving more than 75 microns, resisting a tensile force of 56 Newtons without moving more than 0.5 mm, has free play about θx of less than 0.1 degrees about the θx-axis when a 200 N-mm torque is applied in the θx-direction, having free play in the y-direction of less than 75 microns when a 4 Newton tensile force is applied in the y-direction, having a required insertion force of less than 5 Newtons in the y-direction.

Thus, at least one embodiment described herein may meet only one of the disclosed ranges and/or values described herein for a secure connection while failing to meet the other disclosed ranges and/or values described herein (with or without specific insertion force values and/or specific numbers of locking components). At least one embodiment disclosed herein may meet two or more of the disclosed ranges and/or values described herein for a secure connection while failing to meet the other disclosed ranges and/or values described herein (with or without meeting specific insertion force values and/or specific numbers of locking components). Thus, every permutation of these values are considered a part of this disclosure.

Returning to the description of FIGS. 3 and 4, in other embodiments, computing components on the first portion 302 may be in electronic communication with computing components on the second portion 304 via a wireless connection. For example, the first portion 302 may include a wireless receiver (not shown) and the second portion 304 may include a wireless transmitter (not shown) (or vice versa). In another example, both the first portion 302 and the second portion 304 may include a wireless transmitter and a wireless receiver (e.g., wireless transceivers).

Additionally, the locking protrusions 330, in the illustrated embodiment, may include a planar upper surface and a planar lower surface. The locking protrusions 330 may have rounded (e.g., chamfered) edges, for example.

The apertures 341 of the locking receptacles 340 on the first portion 302 are shown as being rounded on their front (e.g., in the z-direction) edges. In other embodiments, the apertures 341 of the locking receptacles may be rounded on their bottom (e.g., in the negative z-direction) edges. In further embodiments, the aperture 341 locking receptacle 340 may have an elongate rectangular shape. However, in embodiments where the locking receptacle 340 has an elongate rectangular shape, the locking protrusion 330 may be more likely to become bound within the locking receptacle 340. For example, when a locking protrusion 330 does not have much space within its corresponding locking receptacle 340, any twist about the y- or x-axis may bind the locking protrusion 330 in the locking receptacle 340. In order to prevent binding, a user would need to pull toward the bottom without significant rotation. However, by providing a few degrees of twist about the y-axis, some rotation may be possible without binding the locking protrusion 330 within the locking receptacle 340.

Figures 1, 8:
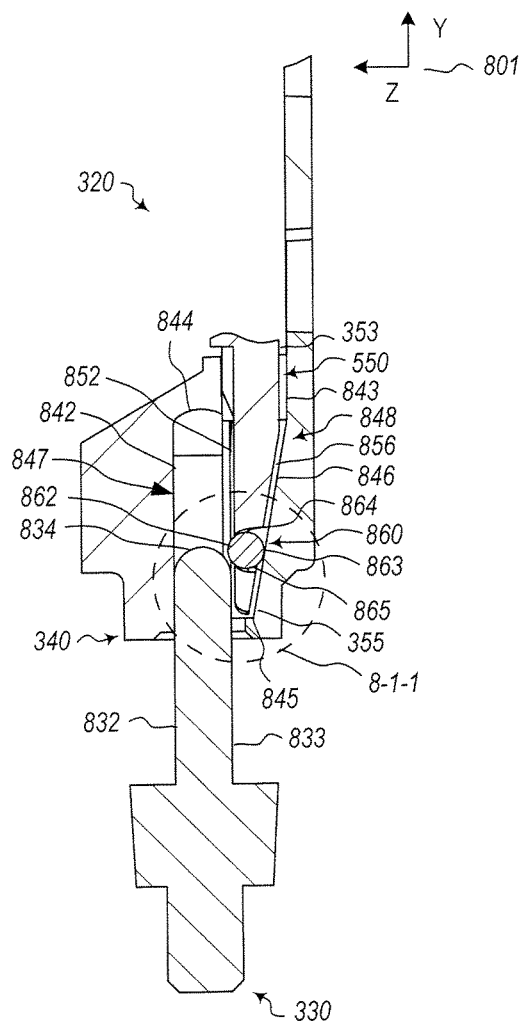
Figures 1, 8:
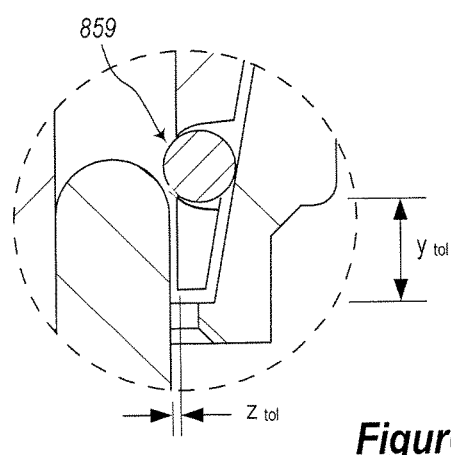
Figures 2, 8:
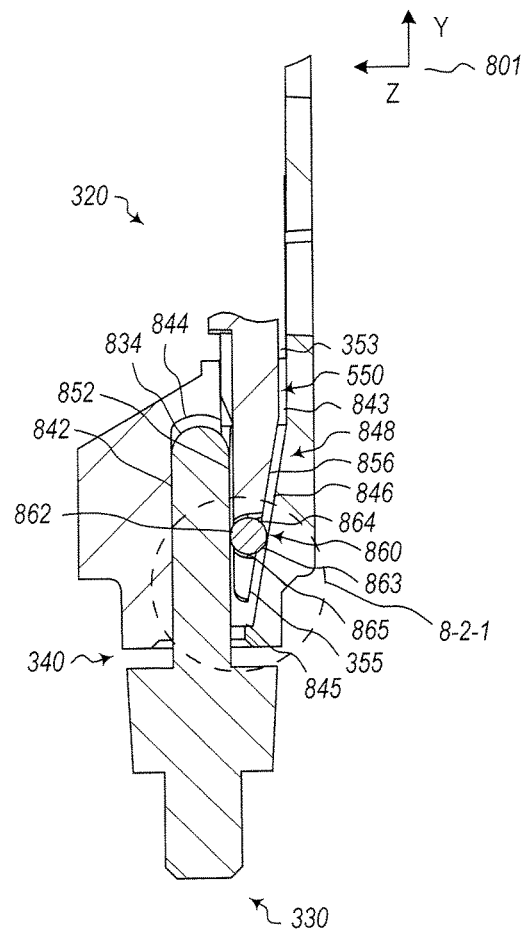
Figures 1, 2, 8:
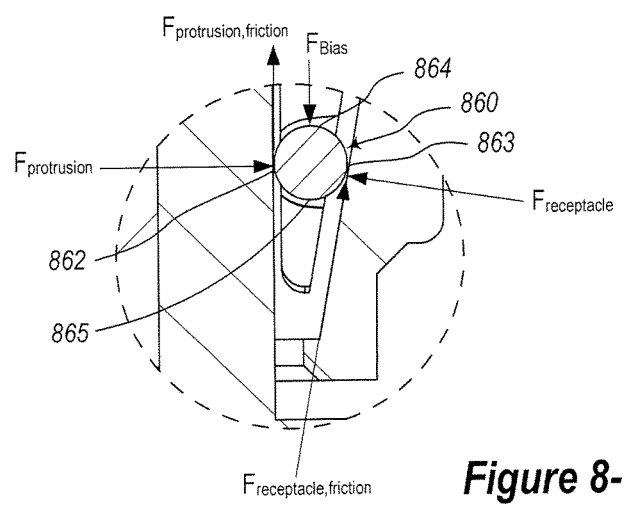
Figures 3, 8:
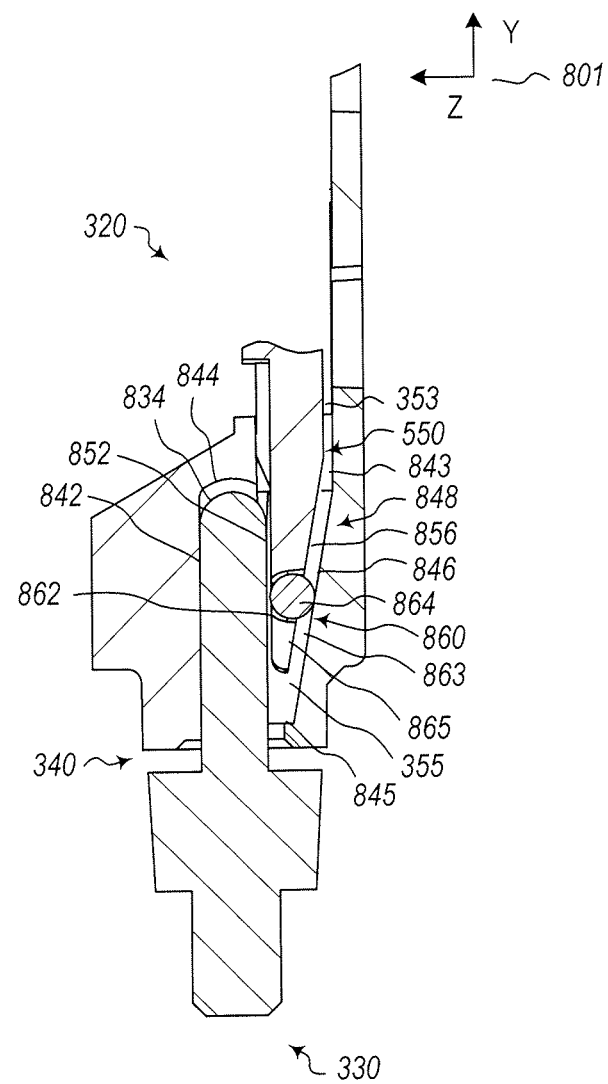

FIG. 8-1 is a partial cross-sectional side view of an embodiment of a locking system 320 in an undocked configuration. FIG. 8-2 is a partial cross-sectional side view of the embodiment of the locking system 320 in FIG. 8-1 in a locked configuration (e.g., docked and locked configuration). FIG. 8-1-1 is an exploded view of area 8-1-1 in FIG. 8-1. FIG. 8-2-1 is an exploded view of area 8-2-1 in FIG. 8-2. FIG. 8-3 is a partial cross-sectional side view of the embodiment of a locking system 320 in FIG. 8-1 in an unlocked configuration (e.g., docked, but unlocked configuration). Referring generally to FIGS. 8-1, 8-2, and 8-3, a more detailed view and explanation of the interaction of carrier 550 of locking mechanism 504 and locking protrusion 330 is explained below.

As discussed above, the locking mechanism 504 may include carrier 550, which may include a front surface 852, a back surface 353, a top surface 854, a bottom surface 355, and a tapered surface 856. The carrier 550 may include a rotating lock aperture 859 that is configured to engage the rotating lock 860. The locking protrusion 330 may include a front surface 832, a back surface 833, and a top surface 834. The locking receptacle 340 may include a front surface 842, a back surface 843, a top surface 844, a bottom surface 845, a tapered surface 846, a locking protrusion portion 847 (e.g., the portion of the locking receptacle 340 into which the locking protrusion 330 may be inserted), and a carrier portion 848 (e.g., the portion of the locking receptacle 340 into which the carrier 550 may be inserted).

The locking protrusion portion 847 of the locking receptacle 340 may be sized and/or configured to receive the locking protrusion 330. The carrier portion 848 of the locking receptacle 340 may be sized and/or configured to receive the carrier 550. The front surface 842 of the locking receptacle 340 may be sized and oriented to abut the front surface 832 of the locking protrusion 330. The back surface 843 of the locking receptacle 340 may be sized and oriented to abut the back surface 353 and/or bottom surface 355 of the carrier 550. The top surface 844 of the locking receptacle 340 may be configured to abut the top surface 834 of the locking protrusion 330 in a locked configuration. The bottom surface 845 of the locking receptacle 340 may be configured to engage the bottom surface 355 of the carrier 550. The tapered surface 846 of the locking receptacle 340 may be configured to engage the tapered surface 856 of the carrier 550.

The tapered surface 846 of the locking receptacle 340 is angled relative to the back surface 843 of the locking receptacle 340. The angle may be determined by $2\times[(\tan)]^{\wedge}(-2)\mu$, where $\mu$ is the coefficient of friction of the material of the tapered surface 846 of the locking receptacle 340. For example, the coefficient of friction, $\mu$ of steel is 0.1, thus the angle of the tapered surface 846 may be less than 11.4 degrees. The illustrated angle is ten degrees.

The rotating lock 860 may rotate about an axis. Examples of rotating locks include a sphere, a spheroid, a cylinder, a gimbal, a cam, other rotating locks, or combinations thereof. The rotating lock 860 may include a front surface 862, a back surface 863, a top surface 864, and a bottom surface 865. Although described in terms of front and back surfaces 862, 863, as the rotating lock 860 rotates the front surface 862 may no longer be the "front". In other words, as the front surface 862 rotates one-hundred and eighty degrees, the front surface 862 is now in the same rotational position as the back surface 863 before rotation began. Thus, for ease of description, the front surface 862 is the portion of the outer surface of the rotating lock 860 that is closest to the back surface 833 of the locking protrusion 330, the back surface 863 is the portion of the outer surface of the rotating lock 860 that is closest to the back surface 843 of the locking receptacle 340, the top surface 864 is the portion of the outer surface of the rotating lock 860 that is closest to the top (e.g., in the y-direction) of the locking system 320, and the bottom surface 865 is the portion of the outer surface of the rotating lock 860 that is closest to the bottom (e.g., in the negative y-direction) of the locking system 320.

In the undocked configuration shown in FIG. 8-1, the locking protrusion 330 has not yet been inserted into the locking protrusion portion 847 of the locking receptacle 340. In this undocked configuration, at least a portion of the carrier 550 may be inserted into the carrier portion 848 of the locking receptacle 340. The carrier 550 may be biased toward the bottom surface 845 and into the carrier portion 848 of the locking receptacle 340 by, for example, spring element 518.

In some embodiments, the carrier 550, may abut a stop surface. The locking receptacle 340 may include a stop surface that limits movement of the carrier 550 toward the bottom of the locking system 320. For example, a portion of the carrier 550 may abut a top facing (e.g., in the y-direction) surface of the locking receptacle 340. When the carrier 550 abuts a top facing surface (e.g., the top surface 844, the bottom surface 845, the tapered surface 846, or combinations thereof of the locking receptacle 340), the carrier 550 may be in its bottom-most position. When the carrier 550 is in its bottom-most position, the rotating lock 860 may be in its top-most (e.g., in the y-direction) and front-most (e.g., in the z-direction) position, as well.

The front surface 862 of the rotating lock 860 may extend at least partially into the locking protrusion portion 847 of the locking receptacle 340 in the undocked configuration. As can be seen in FIG. 8-1, the front surface 862 of the rotating lock 860 extends forward (e.g., in the z-direction) beyond a plane (not shown) of the back surface 833 of the locking protrusion 330. Thus, as the locking protrusion 330 is inserted into the locking receptacle 340, the top surface 834 of the locking protrusion 330 may contact the rotating lock 860 (e.g., the front surface 862 and/or the bottom surface 865 of the rotating lock 860).

The tapered surface 846 of the locking receptacle 340 may abut the bottom surface 865 of the rotating lock 860. The tapered surface 846 may be substantially planar (e.g., flat), such that the rotating lock 860 may rotate (e.g., roll) between the bottom surface 845 and the back surface 843 of the locking receptacle 340.

In embodiments where a rotating lock 860 is used, the rotating lock 860 may act as a tolerance capacitor. In other words, the rotating lock 860 may allow a relaxation of tolerance requirements for other components of the locking mechanism. In other words, the rotating lock 860, as shown in FIG. 8-1-1, may have a tolerance capacity in the z-direction and a tolerance capacity in the y-direction. For example, in the z-direction, the thickness from the front surface 832 to the back surface 833 of the locking protrusion 330 may have a nominal value and a tolerance, the width in the z-direction of the locking protrusion portion 847 of the locking receptacle 340 may have a nominal value and a tolerance, the maximum width (e.g., at the bottom of the tapered surface 856) of the carrier 550 may have a nominal value and a tolerance, the maximum width (e.g., at the bottom of the tapered surface 846) of the carrier portion 848 of the locking receptacle 340 may have a nominal value and a tolerance, the minimum width (e.g., at the top of the tapered surface 856) of the carrier 550 may have a nominal value and a tolerance, the minimum width (e.g., at the top of the tapered surface 846) of the carrier portion 848 of the locking receptacle 340 may have a nominal value and a tolerance, and the diameter of the rotating lock 860 may have a nominal value and a tolerance. However, one or more of the tolerance values may be reduced due to the tolerance capacity in the z-direction provided by the rotating lock 860.

In another example, the tolerances of the locking protrusion 330, the locking receptacle 340, and the rotating lock 860 in the z-direction may determine the locked position (e.g., the position where front surface 862 of the rotating lock 860 first abuts the back surface 833 of the locking protrusion 330) of the rotating lock 860 in the y-direction. Thus, the locked position of the rotating lock 860 may be independent of its position in the y-direction and/or of the y-tolerances and/or z-tolerances to the extent that the rotating lock 860 is able to move in the positive and negative y-direction. In the illustrated embodiment, the rotating lock 860 may move plus or minus 0.5 mm, which soaks up about plus or minus 0.16 mm of tolerances from the locking protrusion 330, the locking receptacle 340, and the rotating lock 860 in the z-direction.

In some embodiments, the tolerances of these various dimensions may be very small in order to prevent binding of the locking components within the locking receptacle 340. However, the rotating lock 860 may allow a relaxation (e.g., an increase in) at least one of the various tolerances. This is due to the fact that the only requirement for the rotating lock 860 to lock the locking protrusion 330 in the locking receptacle 340 is for the rotating lock 860 to be properly seated (e.g., be positioned at least partially into the locking protrusion portion 847 of the locking receptacle 340) such that the front surface 862 of the rotating lock 860 abuts the back surface 833 of the locking protrusion 330.

For example, for an embodiment where the thickness from the front surface 832 to the back surface 833 of the locking protrusion 330 is nominally 1.5 mm with a tolerance of plus or minus 25 microns, the width in the z-direction of the locking protrusion portion 847 of the locking receptacle 340 at the nominal position of the rotating lock 860 is nominally 2.5 mm with a tolerance of plus or minus 65 microns, and the diameter of the rotating lock 860 is nominally 1.0 mm with a tolerance of plus 8 microns or minus 5 microns, the tolerance capacity of the rotating lock 860 in the z-direction may be plus or minus 300 microns. In other words, one or more of the tolerances may be increased by a portion of the tolerance capacity of the rotating lock 860 in the z-direction. In embodiments with a rotating lock 860, all of the tolerances in the z-direction of the locking protrusion 330, the locking receptacle 340, and the rotating lock 860 may be converted into uncertainty of the roller position. In other words, if all the locking components are at their extreme positions, the rotating lock 860 may be at its extreme position. In embodiments where the thickness of the computing device (e.g., computing device 300) is limited, the tolerances in the thickness direction (e.g., the z-direction) may be very small. However, if the computing device has space in other directions (e.g., the y-direction), the rotating lock 860 may soak up the tolerances in the thickness direction and convert them into position uncertainty for the rotating lock 860.

As the locking system 320 transitions from the undocked configuration shown in FIG. 8-1 to the docked configuration shown in FIG. 8-2, the rotating lock 860 moves toward the top (e.g., in the y-direction) of the locking system 320. For example, as the locking protrusion 330 is inserted into the locking receptacle 340, the top surface 834 of the locking protrusion 330 may abut and move the rotating lock 860 toward the top of the locking system 320. As the rotating lock 860 is pushed toward the top of the locking system 320, the rotating lock 860 moves both toward the top (e.g., in the y-direction) and toward the back (e.g., in the negative z-direction) of the locking system 320. As the bottom surface 865 of the rotating lock 860 transitions from contact with the top surface 834 of the locking protrusion 330, the top surface 864 of the rotating lock 860 comes into contact with the back surface 833 of the locking protrusion 330.

In embodiments where the rotating lock 860 is biased toward the bottom surface 845 of the locking protrusion, the forces being applied to the rotating lock 860 are illustrated in FIG. 8-2-1. The biasing force (e.g., a force applied by a biasing mechanism such as a spring) is applied to the top surface 864, which results in the force applied by the locking receptacle 340 (e.g., normal to the tapered surface 846) on the bottom surface 865 of the rotating lock 860 and the force applied by the locking protrusion 330 (e.g., normal to the back surface 833) on the front surface 862 of the rotating lock 860 (ignoring the force of gravity) as well as the force due to the friction (e.g., $\mu$*FReceptacle) of the locking receptacle 340 and the force due to friction (e.g., $\mu$*FProtrusion) of the locking protrusion 330. In other embodiments, the forces applied to the rotating lock may differ. For example, instead of a biasing force, gravity may be used to move the rotating lock 860 toward the bottom of the locking system 320.

In the undocked configuration shown in FIG. 8-1, the rotating lock 860 may be housed by the rotating lock aperture 859 of the carrier 550. The rotating lock aperture 859 may couple movement of the rotating lock 860 with the carrier 550 in at least one direction. For example, as shown in FIG. 8-1, the rotating lock aperture 859 may couple movement of the rotating lock 860 in the top and bottom (e.g., in the y-direction) directions. As shown, the rotating lock aperture 859 may limit movement in the front and back (e.g., in the z-direction) direction of the rotating lock 860. For example, the rotating lock aperture 859 may be shaped to correspond with at least a portion of the shape of the rotating lock 860. As shown, an inner surface of the rotating lock aperture 859 may be curved internally in a front portion and/or a back portion to correspond with an outer surface of the rotating lock 860. In embodiments where the front surface 852 of the carrier 550 abuts with a back facing surface in the carrier portion 848 of the locking receptacle, the front surface 852 of the carrier 550 may combine with the rotating lock aperture 859 to limit movement in the front and back direction of the rotating lock 860.

In embodiments without a carrier 550, the rotating lock 860 may abut a back facing surface in the carrier portion 848 to allow only a portion of the rotating lock 860 to enter the locking protrusion portion 847 of the locking receptacle 340. For example, the rotating lock 860 may be shaped such that a left and/or right portion of the rotating lock 860 has a smaller dimension in the front and back direction than a middle portion (e.g., between the left and right portions) of the rotating lock 860, such that the middle portion still extends, at least partially, into the locking protrusion portion 847 of the locking receptacle 340 when another portion (e.g., the left and/or right portion) is prevented from doing so.

The top surface 834 of the locking protrusion 330 and the top surface 844 of the locking receptacle 340 are illustrated with complementary rounded, convex faces. In other embodiments, the top surface 834 of the locking protrusion 330 and/or the top surface 844 of the locking protrusion may be otherwise shaped (e.g., complementary, not complementary, rounded, not rounded, convex, concave, or combinations thereof).

To transition from the locked configuration shown in FIG. 8-2, a force must be applied to the carrier 550 to retract the rotating lock 860. As the carrier 550 is transitioned from the locked configuration toward the unlocked configuration, the tapered surface 856 of the carrier 550 may cease to contact the tapered surface 846 of the locking receptacle 340. In the illustrated embodiment, at least the portion of the carrier 550 that fits into the carrier portion 848 of the locking receptacle 340 may be rigid. In other embodiments, at least a portion of the carrier 550 may be elastically deformable such that when the tapered surface 856 of the carrier 550 initially contacts the tapered surface 846 of the locking receptacle, the carrier 550 elastically deforms (e.g., bends) as the carrier 550 advances and returns toward its initial state as the carrier 550 is retracted. Thus, the tapered surface 856 of the carrier 550 may remain in contact with the tapered surface 846 of the locking receptacle 340 as the carrier 550 is retracted.

Once the rotating lock 860 no longer contacts the back surface 833 of the locking protrusion 330, the locking protrusion 330 may be removed. In some embodiments, the first portion 302 and the second portion 304 may stay together in the unlocked configuration. In other embodiments, the locking system 320 may return to the locked/docked configuration of FIG. 8-2 after a predetermined period of time.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Several aspects of an actuated locking device have been described above with reference to various systems and methods. One or more portions of these systems and methods may have been described or illustrated in the accompanying drawings by various blocks, modules, components, circuits, steps, processes, algorithms, etc. (collectively referred to as "elements"). One or more of these elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An actuated locking device, comprising:
    a locking mechanism moveable between a first position and a second position;
    an actuator connected to the locking mechanism that actuates the locking mechanism for moving between the first position and the second position; and
    a hardstop switch having a body including a surface positioned to limit movement of the locking mechanism to one of the first position or the second position in response to contacting the hardstop switch, wherein at least the surface of the body comprises an electrically conductive material such that at least the surface defines a switch that completes an electrical circuit when the locking mechanism contacts the surface of the body of the hardstop switch.

2. The actuated locking device of claim 1, further comprising a processor having an electrical control function for controlling movement of the actuator, wherein the processor executing the electrical control function is configured to maintain actuation of the locking mechanism, for at least a period of time, at at least one of the first position or the second position based at least in part on the switch completing the electrical circuit.

3. The actuated locking device of claim 1, wherein the actuator comprises a shape memory alloy wire connected to the locking mechanism and an actuation element to apply an electrical signal to the shape memory alloy wire to facilitate at least one of contracting the shape memory alloy wire from a first phase to a second phase or expanding the shape memory alloy wire from the second phase to the first phase to actuate the locking mechanism.

4. The actuated locking device of claim 3, further comprising a processor having an electrical control function for controlling the actuation element to apply the electrical signal to the shape memory alloy wire to cause the shape memory alloy wire to contract from the first phase to the second phase for moving the locking mechanism to at least one of the first position or the second position, wherein the electrical control function controls the actuation element to apply the electrical signal to maintain actuation of the locking mechanism based at least in part on the switch completing the electrical circuit.

5. The actuated locking device of claim 4, wherein the electrical control function controls the actuation element at least in part by modulating the electrical signal to maintain a shape corresponding to the second phase of the shape memory alloy wire such to maintain actuation of the locking mechanism.

6. The actuated locking device of claim 4, wherein the actuator further comprises a spring element connected to the locking mechanism, wherein the spring element causes the locking mechanism to move to at least another one of the first position or the second position when the actuation element applies the electrical signal to the shape memory alloy wire to cause the shape memory alloy wire to expand from the second phase to the first phase.

7. The actuated locking device of claim 3, wherein the shape memory alloy wire comprises a nitinol wire.

8. The actuated locking device of claim 1, wherein the locking mechanism is electrically coupled to a system ground to facilitate the switch completing the electrical circuit when the locking mechanism contacts the body of the hardstop switch.

9. A computing device, comprising:
    a first portion;
    a second portion removably coupled to the first portion;
    a locking mechanism configured to lock the first portion to the second portion, the locking mechanism including a locking receptacle connected to one of the first portion or the second portion, and a locking protrusion connected to the other one of the first portion or the second portion;
    an actuator mechanically coupled to the locking mechanism and configured to move the locking mechanism between a first position and a second position, where one of the first position or the second position corresponds to a locked state and the other one of the first position or the second position corresponds to an unlocked state, the actuator comprising:
    a hardstop switch having a body including a surface positioned to limit movement of the locking mechanism to one of the first position or the second position in response to contacting the hardstop switch, wherein at least the surface of the body comprises an electrically conductive material such that at least the surface defines a switch that completes an electrical circuit when the locking mechanism contacts the surface of the body of the hardstop switch.

10. The computing device of claim 9, wherein the actuator comprises a shape memory alloy wire connected to the locking mechanism and an actuation element to apply an electrical signal to the shape memory alloy wire to facilitate at least one of contracting the shape memory alloy wire from a first phase to a second phase or expanding the shape memory alloy wire from the second phase to the first phase to actuate the locking mechanism.

11. The computing device of claim 10, further comprising a processor having an electrical control function for controlling the actuation element to apply the electrical signal to the shape memory alloy wire to cause the shape memory alloy wire to contract from the first phase to the second phase for moving the locking mechanism to at least one of the first position or the second position, wherein the electrical control function controls the actuation element to apply the electrical signal to maintain actuation of the locking mechanism based at least in part on the switch completing the electrical circuit.

12. The computing device of claim 11, wherein the electrical control function controls the actuation element at least in part by modulating the electrical signal to maintain a shape corresponding to the second phase of the shape memory alloy wire such to maintain actuation of the locking mechanism.

13. The computing device of claim 11, wherein the actuator further comprises a spring element connected to the locking mechanism, wherein the spring element causes the locking mechanism to move to at least another one of the first position or the second position when the actuation element applies the electrical signal to the shape memory alloy wire to cause the shape memory alloy wire to expand from the second phase to the first phase.

14. The computing device of claim 10, wherein the actuation element comprises an electrical connector configured to carry electricity to generate heat to the shape memory alloy wire.

15. The computing device of claim 9, wherein the locking mechanism is electrically coupled to a system ground to facilitate the switch completing the electrical circuit when the locking mechanism contacts the body of the hardstop switch.

16. The computing device of claim 9, wherein the hardstop switch is composed of a metal or a conductive rubber.

17. The computing device of claim 9, wherein the hardstop switch comprises an internal wall defining a through-hole and an external wall defining an annular shape, and wherein at least one of the first portion or the second portion includes a chassis that defines a column for mounting the hardstop switch to the chassis.

18. A method for controlling an actuated locking device, comprising:
 actuating a locking mechanism to move between a first position and a second position;
 limiting movement of the locking mechanism to one of the first position or the second position in response to contacting a surface of a body of a hardstop switch, wherein at least the surface of the body comprises an electrically conductive material; and
 detecting completion of an electrical circuit at the hardstop switch caused by the locking mechanism contacting the surface of the body of the hardstop switch at one of the first position or the second position.

19. The method of claim 18, further comprising maintaining actuation of the locking mechanism at the one of the first position or the second position based at least in part on detecting completion of the electrical circuit.

20. The method of claim 19, wherein actuating the locking mechanism comprises applying an electrical signal to a shape memory alloy wire connected to the locking mechanism, and wherein maintaining actuation of the locking mechanism at the one of the first position or the second position comprises modulating the electrical signal to substantially maintain a temperature of the shape memory alloy wire to substantially maintain contraction of the shape memory alloy wire.

* * * * *